US006904370B1

(12) United States Patent
Levinson et al.

(10) Patent No.: US 6,904,370 B1
(45) Date of Patent: Jun. 7, 2005

(54) SYSTEM, METHOD, AND COMPUTER-READABLE MEDIUM FOR COLLECTION OF ENVIRONMENTAL DATA AND GENERATION OF USER REPORT FOR COMPLIANCE WITH FDA REQUIREMENTS

(75) Inventors: George M. Levinson, Long Grove, IL (US); Timothy P. Joyce, Chicago, IL (US); Victoria Galliani, Lincolnshire, IL (US)

(73) Assignee: Compliance Software Solutions Corp., Vernon Hills, IL (US)

( * ) Notice: Subject to any disclaimer, the term of this patent is extended or adjusted under 35 U.S.C. 154(b) by 0 days.

(21) Appl. No.: 10/747,974

(22) Filed: Dec. 30, 2003

(51) Int. Cl.[7] .............................................. G06F 17/60
(52) U.S. Cl. ............................ 702/19; 702/24; 702/84; 702/182; 702/184
(58) Field of Search .............................. 702/19, 24, 84, 702/182, 184; 700/29, 106, 108, 109, 266, 276; 705/2, 51; 340/539.26, 539.19, 540

(56) References Cited

U.S. PATENT DOCUMENTS

| | | | |
|---|---|---|---|
| 4,298,955 A | 11/1981 | Munday et al. | |
| 5,103,391 A | 4/1992 | Barrett | |
| 5,631,839 A | 5/1997 | Lemoine | |
| 5,691,895 A | 11/1997 | Kurtzberg et al. | |
| 5,719,796 A | 2/1998 | Chen | |
| 5,787,021 A | 7/1998 | Samaha | |
| 5,798,945 A | 8/1998 | Benda | |
| 5,838,906 A | 11/1998 | Doyle et al. | |
| 5,862,054 A | 1/1999 | Li | |
| 5,892,690 A | 4/1999 | Boatman et al. | |
| 6,163,732 A | 12/2000 | Petke et al. | |
| 6,336,900 B1 * | 1/2002 | Alleckson et al. | 600/485 |
| 6,437,692 B1 | 8/2002 | Petite et al. | |
| 6,450,411 B1 * | 9/2002 | Rash et al. | 236/44 A |
| 6,523,045 B1 | 2/2003 | Beatty | |
| 6,539,271 B2 | 3/2003 | Lech et al. | |
| 6,574,522 B1 | 6/2003 | Douglas | |
| 6,604,023 B1 | 8/2003 | Brown et al. | |
| 2004/0039706 A1 * | 2/2004 | Skowron et al. | 705/51 |
| 2004/0093240 A1 * | 5/2004 | Shah | 705/2 |
| 2004/0133453 A1 * | 7/2004 | Jomini et al. | 705/2 |

OTHER PUBLICATIONS

Compliance Software Solutions Corp. web page description of its Environmental Monitoring Software System (EMSS) (3 sheets).
BD Diagnostic Systems, Industrial web page description of the Environmental Monitoring Software System (EMSS) of Compliance Software Solutions Corp. (2 sheets).
BD Diagnostic Systems, Industrial web page description of the Environmental Monitoring Software System (EMSS) of Compliance Software Solutions Corp. (3 sheets).
Compliance Software Solutions Corp. web page description of its Environmental Monitoring Software System (EMSS), in connection with 21 CFR Part 11 Compliance Assessment (4 sheets).
Compliance Software Solutions Corp. web page description of its Environmental Monitoring Software System (EMSS) (168 sheets).

* cited by examiner

Primary Examiner—Carol S. W. Tsai
(74) Attorney, Agent, or Firm—Banner & Witcoff, Ltd.

(57) ABSTRACT

A system, method, and computer-readable medium for the collecting and storing of environmental data, and generating a user report of the environmental data, the user report providing document compliance with U.S. Food and Drug Administration requirements. The collected and stored environmental data includes a wide variety of manufacturing facility parameter data, including but is not limited to, the presence of viable microbiological organisms, the presence of particulates and other environmental conditions within the facility, such as humidity, pressure, temperature, water quality (e.g., pH, conductivity, total organic content (TOC), endotoxin, coliform, and metals), and the respective amounts of different materials involved in the manufacture of the end product(s).

31 Claims, 24 Drawing Sheets

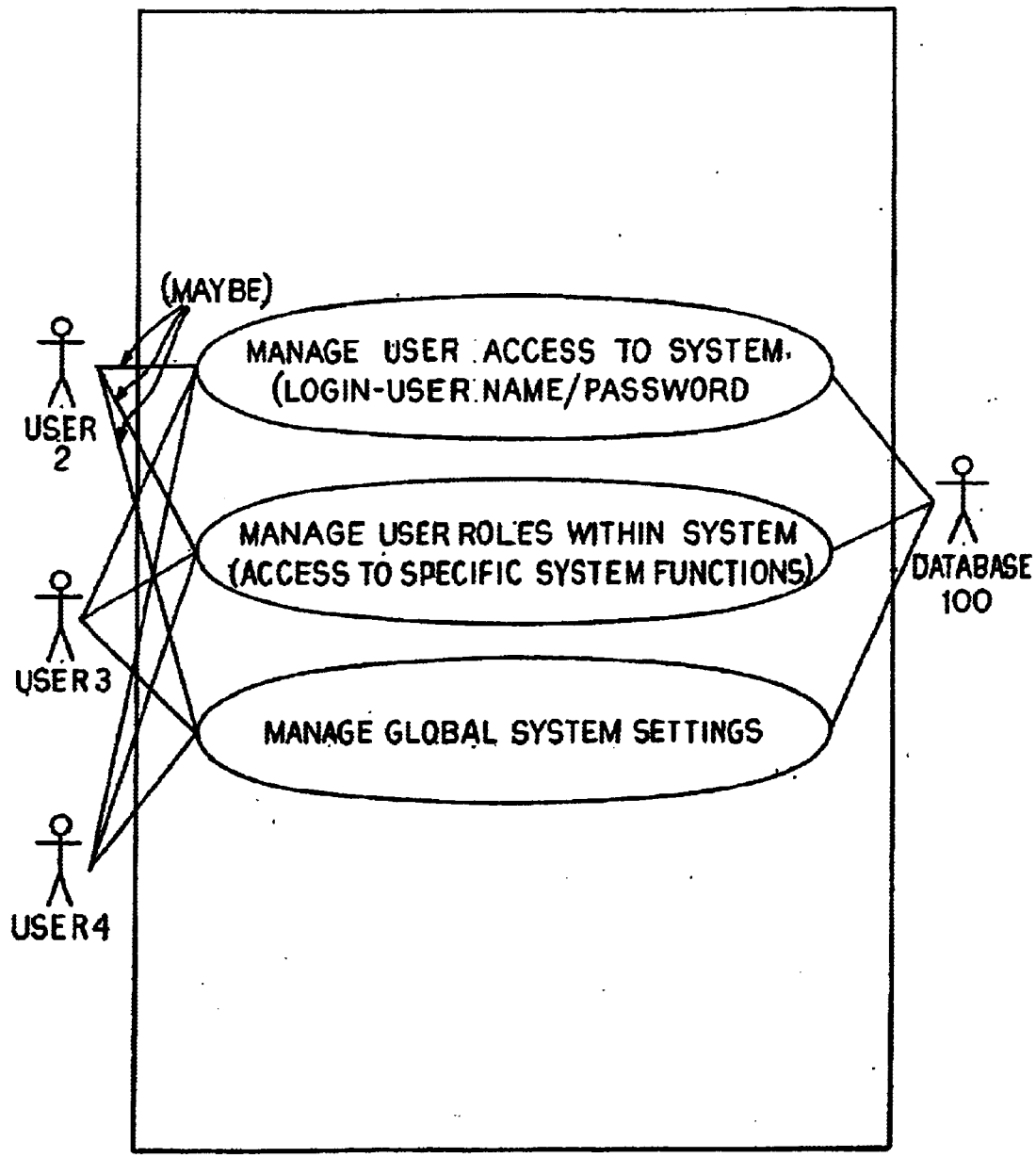

Worklist: Enter Information

Worklist: Sample Site

Worklist: Enter Number of Results

Log in Results: Organism Review

FIGURE 11K

Sample Review:

FIGURE 11L

SYSTEM, METHOD, AND COMPUTER-READABLE MEDIUM FOR COLLECTION OF ENVIRONMENTAL DATA AND GENERATION OF USER REPORT FOR COMPLIANCE WITH FDA REQUIREMENTS

RELATED APPLICATION

None

FIELD OF THE INVENTION

The present invention relates to the collection of environmental data and generation of a user report for compliance with U.S. Food and Drug Administration (FDA) requirements.

BACKGROUND OF THE INVENTION

A wide range of parameters can adversely impact the quality of manufactured products within a facility. Such parameters can include, but are not limited to, the presence of viable microbiological organisms, the presence of particulates and other environmental conditions within the facility, such as humidity, pressure, temperature, water quality (e.g., pH, conductivity, total organic content (TOC), endotoxin, coliform, and metals), and the respective amounts of different materials involved in the manufacture of the end product(s).

Conventional software packages, such as Microsoft Excel spreadsheet and Access database programs, lack the processing and reporting power, and thus they do not pass governmental regulatory requirements for pharmaceutical, biotechnology, and medical device manufacturers. For example, these programs do not provide any audit trail or electronic signature capabilities as required by the FDA. See e.g., 21 CFR Part 11.

In conventional laboratory information management systems (LIMS), the chemistry of water samples is entered into a predetermined fixed database.

One system, called the Environmental Monitoring Software System (by Compliance Software Solutions Corp. of Vernon Hills, Illinois, the assignee of the present invention), provides a cost effective and efficient means to manually enter into a computer database program the presence of viable microbiological organisms, the presence of particulates and other environmental conditions within the facility, such as humidity, pressure, temperature, water quality (e.g., pH, conductivity, total organic content (TOC), endotoxin, coliform, and metals), and the respective amounts of different materials involved in the manufacture of the end product(s). Thus, this system provides a means to access and document facility operations and trend data to ensure that the environmental control systems of a facility are operating as intended. This system is particularly useful for pharmaceutical, biotechnology, and medical device manufacturers, who must comply with strict quality control requirements of governmental bodies. This system meets the requirements of 21 CFR Part 11.

While this system is quite useful and successful, all of the data must be entered manually into the database of the system. Also this system does not provide the user with the capability of configurable reports, such as configuring: certain data records to include in the reports, displayed fields, sort and grouping of data records, formatting of data (e.g., tables and graphs). Further, this system allows each authorized user to access all system functions, which may be undesirable from a security standpoint.

SUMMARY OF THE INVENTION

The present invention provides a system, method, and computer-readable medium for the collection of a wide variety of manufacturing facility parameter data, including but not limited to, environmental data, and the generation of a user report providing document compliance with governmental requirements, e.g., U.S. FDA requirements. The computer-readable medium of the present invention can be any suitable medium, including but not limited to a physical, optical or magnetic disk, such as a floppy disk or a CD-ROM.

In one embodiment, the present invention provides a data management system and method having a universal hub in electronic communication with at least one piece of equipment used to automatically measure environmental data, the system configured to collect and store the environmental data, and generate a user report of the environmental data, the user report providing document compliance with governmental requirements, such as U.S. FDA requirements.

In another embodiment, the present invention provides a data management system and method that enables a user to create configurable reports, such as configuring: certain data records to include in the reports, displayed fields, sort and grouping of data records, formatting of data (e.g., tables and graphs).

In another embodiment, the present invention provides a data management system and method that allows each authorized user to access to predetermined specific system functions, as may desirable from a security standpoint.

In another embodiment, the present invention provides a system having a universal hub that interfaces with at least one add-on software module for specialized tracking of data unique for a particular manufacturing facility. In this embodiment, the system is configured to collect and store the data, and generate a user report of the data. The user report generated by this system provides document compliance with governmental requirements, such as the U.S. FDA requirements.

In another embodiment, the present invention provides a computer-readable medium having computer-executable instructions for performing the steps of: a) collecting environmental data from a piece of equipment used to automatically measure environmental data, the equipment selected from the group consisting of a particle counter, organism identification system, viable air sampler, facility monitoring system, rapid organism enumeration technology device, bioluminescence device, and water quality detector; b) storing the collected environmental data; and c) generating a user report of the environmental data, the user report providing document compliance with U.S. Food and Drug Administration requirements. The computer-readable medium of the present invention can be any suitable medium, including but not limited to a physical, optical or magnetic disk, such as a floppy disk or a CD-ROM.

In another embodiment, the present invention provides a computer-readable medium having at least one computer-executable module for specialized tracking of data unique for a particular manufacturing facility, the data selected from the group consisting of media growth promotion, sterility testing, media fills, bioburden, equipment maintenance and calibration, annual report, antibiotic assay, biological indicator, corrective and preventative action, cleaning and disinfection validation and tracking, container closure integrity, endotoxin testing, filter integrity, package integrity, preservative effectiveness testing, and smoke studies. The module has computer-executable instructions for performing the steps of a) collecting the data; b) storing the data, and c) generating a user report of the data, the user report providing document compliance with U.S. Food and Drug Administration requirements, e.g., electronic records and electronic signature requirements. The computer-readable medium of the present invention can be any suitable medium, including but not limited to a physical, optical or magnetic disk, such as a floppy disk or a CD-ROM.

In accordance with the present invention, any of the foregoing embodiments can be combined in any combination as may be desired.

BRIEF DESCRIPTION OF THE DRAWINGS

FIG. 10 is a flowchart of user maintenance/system settings in accordance with an embodiment of the present invention.

FIGS. 11A through 11L are screen displays generated in accordance with an embodiment of the present invention.

DETAILED DESCRIPTION OF THE PREFERRED EMBODIMENTS

Figure 1:
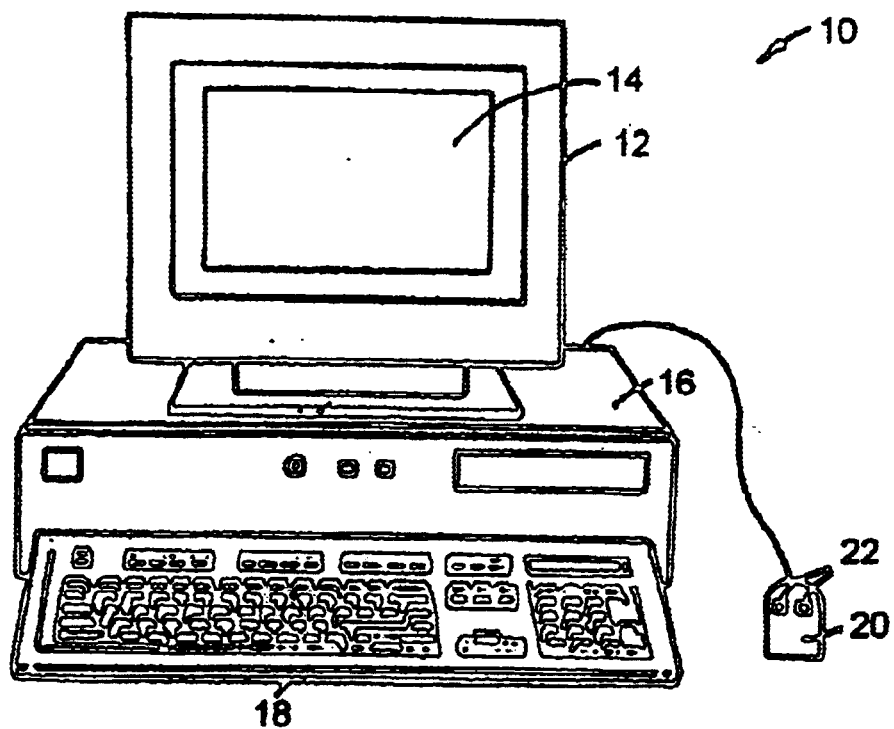
FIG. 1 is an illustration of a computer system suitable for use with the present invention.

The present invention provides a system and method for the collection of a wide variety of manufacturing facility parameter data, including but not limited to, the presence of viable microbiological organisms, the presence of particulates and other environmental conditions within the facility, such as humidity, pressure, temperature, water quality (e.g., pH, conductivity, total organic content (TOC), endotoxin, coliform, and metals), and the respective amounts of different materials involved in the manufacture of the end product(s).

In one embodiment, the present invention provides a data management system having a universal hub or network in communication with at least one piece of equipment used to automatically measure environmental data. The system is configured to collect, store, and generate a user report of the environmental data. The equipment can be selected from the group consisting of a particle counter, organism identification system, viable air sampler, facility monitoring equipment, rapid organism enumeration technology device, bioluminescence device, and water quality detector. The user report generated by the system provides document compliance with U.S. Food and Drug Administration requirements. See e.g., the U.S. FDA requirements set forth in 21 CFR Part 11. Preferably, the user report generated by the system of the present invention complies with U.S. FDA requirements for electronic records and electronic signatures.

In a preferred embodiment, the facility monitoring equipment is selected from the group consisting of Heating, Ventilation, Air Conditioning (HVAC) systems, including but not limited to an air flow detector, humidity detector, pressure monitor, and/or thermometer.

In a preferred embodiment, the water quality detector is selected from the group consisting of a pH detector, conductivity detector, total organic content (TOC) detector, endotoxin detector, coliform detector, metal(s) detector, and thermometer.

In another embodiment, the electronic communication between the hub and the equipment is accomplished by a link device that interfaces with the equipment used to measure the environmental data.

In another embodiment, the present invention provides a data management system having a universal hub, the universal hub interfacing with at least one add-on software module for specialized tracking of data unique for a particular manufacturing facility. Preferably, the data is selected from the group consisting of media growth promotion, sterility testing, media fills, bioburden, equipment maintenance and calibration, annual report, antibiotic assay, biological indicator, corrective and preventative action (CAPA), cleaning and disinfection validation and tracking, container closure integrity, endotoxin testing, filter integrity, package integrity, preservative effectiveness testing, and smoke studies. The system is configured to collect and store the data, and generate a user report of the data, the user report providing document compliance with U.S. Food and Drug Administration requirements. See e.g., the U.S. FDA requirements set forth in 21 CFR Part 11.

In another embodiment, the present invention provides a computer-readable medium having computer-executable instructions for performing the steps of: a) collecting environmental data from a piece of equipment used to automatically measure environmental data, the equipment selected from the group consisting of a particle counter, organism identification system, viable air sampler, facility monitoring system, rapid organism enumeration technology device, bioluminescence device, and water quality detector; b) storing the collected environmental data; and c) generating a user report of the environmental data, the user report providing document compliance with U.S. Food and Drug Administration requirements. Those skilled in the art will recognize that software can by readily written and placed onto the computer-readable medium that will accomplish the above steps. The computer-readable medium of the present invention can be any suitable medium, including but not limited to a physical, optical or magnetic disk, such as a floppy disk or a CD-ROM.

In another embodiment, the present invention provides a computer-readable medium having at least one computer-executable module for specialized tracking of data unique for a particular manufacturing facility, the data selected from the group consisting of media growth promotion, sterility testing, media fills, bioburden, equipment maintenance and calibration, annual report, antibiotic assay, biological indicator, corrective and preventative action, cleaning and disinfection validation and tracking, container closure integrity, endotoxin testing, filter integrity, package integrity, preservative effectiveness testing, and smoke studies. The module has computer-executable instructions for performing the steps of a) collecting the data, b) storing the data, and c) generating a user report of the data, the user report providing document compliance with U.S. Food and Drug Administration requirements, e.g., electronic records and electronic signature requirements, and the requirements set forth in 21 CFR Part 11. In a preferred embodiment, the computer-readable medium further has computer-executable instructions for performing the step of configuring the report for certain items, the certain items selected from the group consisting of data records to include, displayed fields, sort and grouping of data records, and formatting of data via a table, bar chart, pie chart, or other visual display. Those skilled in the art will recognize that software can by readily written and placed onto the computer-readable medium that will accomplish the above steps. The computer-readable medium of the present invention can be any suitable medium, including but not limited to a physical, optical or magnetic disk, such as a floppy disk or a CD-ROM.

In another embodiment, the present invention provides enables the user to create configurable reports, such as configuring: certain data records to include in the reports, displayed fields, sort and grouping of data records, formatting of data (e.g., tables and graphs). Those skilled in the art will recognize that software can by readily written and placed onto a computer-readable medium that will accomplish the above steps.

In another embodiment, the present invention provides a data management system and method that allows a user to configure access of a specific individual with access to a predetermined specific system function, as may be desirable from a security standpoint. Those skilled in the art will recognize that software can by readily written and placed onto a computer-readable medium that will accomplish the above steps.

In accordance with the present invention, any of the foregoing embodiments can be combined in any combination as may be desired.

Preferably, the system of the present invention has at least one application selected from the group consisting of system configuration, environmental processing, reports, audit, and server. In the system configuration application the database configuration parameters (e.g., locations, buildings, areas, sites, sample types, classifications, organism information) and the administration functions and system settings (e.g., user accounts, security access, global/local variables) are set. In the environmental processing application the entry of actual environmental monitoring data, e.g., sampling time, sampling personnel, media lots, results, organisms, exceptions, and the review of the entered data is accomplished. In the reports application the retrieval of entered environmental monitoring data is accomplished. For example, a user can manipulate a "report creation wizard" allowing the user to select the type of report to generate (i.e. line graph, bar graph, tabular, etc.), the date range for the report, the data fields to search by within the report (i.e. personnel, product lot, result condition, etc.), and the sorting/grouping for the format of the report. The user can then save the created report "template" for future data retrieval. In the audit application the retrieval of all audit trail information is accomplished. The audit trail functionality of the audit application provides a traceable history of any database record that is easy to follow and interpret. The audit records of the audit application include the transaction information for the record in question and highlight the field(s) that was modified during a data record update. In the server application the data processing methods are consolidated to improve system performance. All of the data processes are performed on the server component of the system to utilize superior resources available on the server hardware. The server application eliminates the need for any database client software to be installed on local workstations. In a preferred embodiment, the system all five applications, i.e., system configuration, environmental processing, reports, audit, and server applications.

In accordance with the present invention, any of the foregoing embodiments can be combined in any combination as may be desired.

In a preferred embodiment, the communication between the hub and the equipment is accomplished by a link device or multi-port data converter that interfaces with the equipment used to measure manufacturing parameters.

The present invention provides a system and method of collecting results for virtually any test, and storing and trending data. This ensures that the control systems are operating as intended. These trends provide valuable insight into the effectiveness of decontamination procedures, housekeeping practices, personnel training, and the potential for microbial build-up during production. The present invention provides configurable means for electronically documenting, storing, and reporting on monitored environmental parameters. Those skilled in the art will recognize that computer programs in accordance with the present invention is able to reside on hardware, and with software that already exists in many manufacturing facilities. The architecture of the system can be designed for a client/server installation. However, it can be also be implemented on a Citrix® or Terminal Server®. The architecture of the system can be installed in virtually any network environment, is compatible with conventional operating systems, and is available to run with either an Oracle® or SQL Server® database.

The system and method of the present invention enables increased user productivity by making the application tasks easier to access and utilize than conventional systems and methods.

In a preferred embodiment, the present invention provides a suite of applications that segregate common system tasks into their own application Graphical User Interfaces (GUI) with an application taskbar. In a preferred embodiment, the system comprises five (5) applications: a server application, an audit application, a reports application, an environmental processing application, and a system configuration application.

Preferably, each user of the system will only be able to access the individual application GUI that user has been given permission to access in order to perform assigned tasks.

The users' experience is enhanced by simplifying data management, data entry, and data retrieval methods. Each of the application GUIs in the suite have their own search components, data record creation wizards, data entry and default functions.

Data retrieval methods are performed with ease and flexibility via the reporting application function. The user is able to use a 'report creation wizard' to select the type of report to generate (e.g. line graph, bar graph, tabular, etc.), the date range for the report, and the data fields to search by within the report (e.g. personnel, product lot, result condition, etc.). After the creation of the report 'template' the user is able to save the created report for future data retrieval.

The audit trail application makes the traceable history of a database record easy to follow and interpret. The audit records application include the transaction information for the record in question, and highlight the field(s) modified during the data record update.

Improved system perform is accomplished by optimizing the data processing methods. All of the data processes are performed on the server component of the application. This takes advantage of the superior resources available on the server hardware. It also eliminates the need to have the client software installed on the local machine running the application.

The suite of the present invention can be installed with its own mail client. This eliminates the need to have the end-users mail client installed on the local computer.

Those skilled in the art will recognize that with the scope of the system's data management capabilities, interfaces can be incorporated into various data collection devices. This allows for the automatic transfer of data into the system database for management, analysis, and reporting. Such data collection devices include viable particle counters (e.g., Met One, Climet Instruments), organism identification systems (e.g., Phoenix™, Vitek, Biolog, MIDI), air samplers (e.g., SAS, and VAI), facility monitoring equipment (e.g., Heating, Ventilation, Air Conditioning (HVAC) systems), rapid organism enumeration technology devices, bioluminescence devices, pressure gauges, thermometers, and humidity detectors.

The data collected by such instrumentation has the same data integrity as the records input into the system 'manually' including result analysis and auditing.

The following is an overview of aspects of a preferred embodiment of the present invention.

Overview

Application Security/Management
  User access
  Settings
Database Configuration/Management
  Location
  Building
  Area
  Site
  Sample Type
  Worklist
Data Processing
  Sample taking
  Initial Data recording
  Final Data processing
    Out-of-specification results (including exception management)
    OK results
    Organism identification
  Data review/approval
  Data modification
Data Output/Reporting
  User-configurable report (query) parameters
  User-configurable report (plot) formats
  'Standard' (non user-configurable) reports
  Process utilities (worksheets, labels, etc.)
  Electronic output
    E-mail notifications
      Out-of-specification results
      'Late/missing' samples, worklists, etc.
  Export options (i.e. PDF, etc.)

Example 1

Potential User Scenarios

User 1: A microbiology technician in a pharmaceutical manufacturing facility's Quality Control Department. User 1's job responsibilities include environmental monitoring, including taking and identifying the samples (all the while using supplies/equipment at the facility), ensuring the correct samples/sampling groups are monitored according to their scheduled days/processes, incubating the samples, keeping track of the incubation periods of stacks of plates (so they are incubated for the correct period of time), counting and recording results, and notifying his supervisor when adverse events occur. User 1 is also responsible for recording all information associated with the environmental monitoring process for the FDA inspector each time monitoring is performed, including sample dates/times, media lots, equipment IDs, and sample IDs. User 1 would like to avoid writing on data sheets/in laboratory notebooks and User 1 desires an easier way to do his/her job, such as automating the management of some of his/her tasks.

User 2: Supervises the microbiology technicians in the Quality Control Department, including User 1. User 2 determines the environmental monitoring schedule, which areas are monitored and when/by whom, and usually delegates the monitoring tasks among his six microbiology technicians. User 2 is responsible for reviewing the data that is processed/recorded by User 1 and the rest of the microbiology technicians for completeness/correctness. User 2 is also notified when something goes wrong with the monitoring process—this includes out-of-specification results, missing/incorrect sampling data that needs to be changed, etc. When adverse events occur, it is User 2's responsibility to investigate/interrogate the situation to determine what happened, its impact regarding the manufacturing processes associated with the environmental monitoring that has "gone awry," determine which actions, if any, need to be taken as a result of the event, and document the conclusion/closure of the excursion. User 2 is in frequent contact with the operations managers, both to find out what is going on in the manufacturing areas (and thus what monitoring needs to be done on which days) and to keep them up to speed on the results of "good" and "bad" monitoring data. User 2 spends a lot of time on the phone with both the operations staff, outside vendors (for ordering environmental monitoring supplies), and his/her boss (Director/Associate Director of Quality Control), who desires a concise "snapshot" of what was going on in manufacturing room A during week B while product C was being made.

User 3: The Director/Associate Director of the Quality Control Department and the supervisor of User 2. User 3 runs the entire Quality Control Department at the company—this includes requesting/approving all documentation generated by User 2, such as the out-of-specification reports and the concise "snapshot" reports displaying the cleanliness of the entire manufacturing facility. User 3 is the person the FDA inspector calls upon for site visits, and User 3 would like an easy way to be able to provide data to the FDA as quickly as possible (instead of going through User 2).

User 4: The Information Technology (IT) Manager, whose majority of his/her day is taken up by answering questions from the myriad of users.

Initial Startup Parameters

Database Connection Parameters

At initial startup, the user will be prompted for the database version (Oracle or SQL Server) and its corresponding database connection parameters Default User Account Creation At initial startup (following the setting of database connection parameters) the user will be prompted to set up a 'SYSTEM' user account for access to the application Default User Account Creation Application Security—Management User access—Accounts/account management
- User accounts are managed within the application (a separate security level from the database/OS security)
- A 'synchronization' function between internal (application) security and external (database/OS) security is preferably included
- User accounts (internal) contain a User ID and password which are used to validate access to the application (application/GUI level security)
- User accounts and their functional access within the application are "configurable"—i.e., using a list of application functions with checkboxes or some other selection method to specify which system functions each account will have access to
- There is an administrator role (pre-configured) which is able to add, delete, and modify user account parameters
- Administrators have the ability to manually 'disable' user accounts
- Passwords are "encrypted" within the system (non-viewable, even by administrator)
- The password change period is set by an administrator on an account-by-account basis (to accommodate temporary employees)
- A password expiration date is set by an administrator
- New user accounts require a change of password at first login
- Passwords have a minimum length of 6 characters and a maximum length of 15 characters
- Passwords contain a combination of alpha and numeric characters
- There is a system option forcing passwords to contain at least 1 alpha and 1 numeric character
- Passwords are case-specific
- User IDs must be unique
- User account records contain the full name manifestation (first and last name)
- All users are able to change his/her password at user prompting as well (i.e. via a 'Change Password' button)—in this case, the change period for this user account is re-set to the "beginning"—i.e., a User Account Management form
- Upon password expiration, the user is prompted to enter a new password
- When changing passwords, the user is prompted to enter their old password, new password, and to re-enter their new password to confirm password change User access—Login
- The system requires input of a valid User ID/password before loading the GUI main screen
- The system autofills the login form with the User ID from the last successful login
- If an invalid User ID and/or password is input, the system notifies the user with a message box that the User ID and/or password are invalid
- The system disables a user account after three (3) unsuccessful login attempts
- The system notifies the administrator upon disabling of an account
- A disabled user account must be reinstated by the system administrator
- The system prevents the "excising" (cut, copy, paste) of the login components (User ID/password)

Environmental Monitoring Site Components

The following components are defined within the system, and each component includes the listed parameters:
- Location (user created)
  - Description (including address, city, state, zip)
- Building (user created)
  - Description
  - Location
- Area (user created)
  - Description
  - Building
  - Classification—may have multiple classifications within an Area
  - Visual representation
- Sample Site (user created)
  - Description (Physical location)
  - Site reference number
  - Area
  - Classification
  - a Site type
  - Sample type
  - Alert/action levels
- Work/Task List (user created)
  - Description
  - Frequency
  - Sample sites/sample types to be monitored
- Sample Type (user modified)*
  - Description
  - Incubation period
  - Visual representation
  - Precision (decimal places for results)
  - List of required fields (input formats)
  - Result entry options (special processing)
- Classification (user modified)*
  - Description
- Site Type (user modified)*
  - Description
  - Denotes that the application comes "pre-configured" with default components/values for Sample Type, Classification, and Site Type entries Environmental Monitoring (EM) Component Configuration
- Localization options—At startup the program prompts the user to review the default components for Sample Type, Classification, and Site Type for correspondence to local (i.e. client standard operating procedures (SOP)) terminology
- If at startup the program detects there are no EM components, the user is guided through the process of creating components of the environmental monitoring site, including locations, buildings, areas, sample sites
- The application allows the user to modify the components post-initialization
- Authorized users have the ability to manually "disable" components Data Processing
Routine Environmental Monitoring
  The system manages the following steps and their associated pieces of information of routine environmental monitoring:
    Prompting the user for input of "pre-monitoring" information such as media lot/equipment ID numbers, operation/process, product code, etc.
    Selective monitoring of pre-defined environmental monitoring "worklists," individual sampling locations, or a combination of both
    Creation of data sheets for recording initial/final environmental monitoring data
    Creation of labels for identifying environmental monitoring sampling supplies (plates, etc.)
    Provide a "user-friendly" method for recording of all system data (data entry)
    Selective management/entry of "initial" environmental monitoring data including sample date/time, sampler identification, etc.
    Provide a check against entered "initial" data for validity of data (i.e. data formatting, entry of invalid date/time with relation to the "centralized" system clock, etc.)
    Variable incubation periods for environmental samples
    Variable exposure periods for environmental samples
    Selective management/entry of "final" environmental monitoring data including read date/time, reader identification, final count, etc.
    Provide a check against entered "final" data for validity of data (i.e. data formatting, entry of invalid date/time with relation to the "centralized" system clock, etc.)
    Provide a means of analyzing entered results (final counts) versus defined specifications for that sample site at the point of data entry
    Upon detection of an out-of-specification condition regarding entered results, notify appropriate personnel of the aberrant event
    Provide a means of managing/tracking such out-of-specification conditions from event occurrence to conclusion/closure of the event
    Notifying the appropriate management-level personnel whether "scheduled" monitoring has taken place or is in process upon system access
    Notifying the appropriate management-level users of the status of all in-process data, including ownership, process stage, etc.
    Notifying the appropriate technical-level personnel the status of environmental monitoring sample records they "own" upon system access, including in-process records, out-of-specification records, etc.
  The system manages the following aspects of an organism identification system which works in conjunction with the environmental monitoring program
    Allow for the recording of organism identification data for all pertinent completed samples
    Upon detection of an out-of-specification condition regarding identified organism (objectionable) results, notify appropriate personnel of the aberrant event
    Allow for user-defined organism characteristics
  The system manages the completed environmental monitoring information from a review/approval standpoint, highlighted by the following;
    Ensure that system users may not review/approve their own environmental monitoring data entries
    Ensure that only system users with the proper access level can review/approve environmental monitoring data entries
    Allow for authorized users to modify completed environmental monitoring records when warranted
    Ensure that the record modification process requires 'change rationale' or equivalent from the authorized user
    Provide the option to preclude the system from sending out-of-specification notifications for completed but not reviewed environmental monitoring data records if specified
    Provide the system option to include completed but not reviewed environmental monitoring data records in reports if specified
Reporting
Report Package
  The system provides a reporting package for final results
    The users are allowed to select the report format, including, but not limited to:
      Line graphs
      Bar graphs
      Histograms
    The users are allowed to select the query parameters, including, but not limited to:
      Date range (sample, result, review)
      Sampler
      Location
      Building
      Area
      Site
      Sample type
      Result status (out-of-specification)
      Worklist
      Process
      Media lot
      Equipment
      Incubator
      Product code
  The system provides a reporting package for identified organisms/isolates
    The users are allowed to select the report format, including, but not limited to:
      Line graphs
      Bar graphs
      Histograms
    The users are allowed to select the query parameters, including, but not limited to:
      Date range (sample, result, review)
      Sampler
      Location
      Building
      Area
      Site
      Sample type
      Organism
        User specified fields
        Out-of-specification organisms (objectionable)
      Worklist
      Process
      Media lot
      Equipment
      Incubator
      Product code
  The system provides a reporting package for excursions
    The users should be allowed to select the query parameters, including, but not limited to:

Date range (sample, result, review)
Sampler
a Location
Building
Area
Site
Sample type
Organism
Worklist
Process
Media lot
Equipment
Incubator
Product code The system provides a reporting package for data result status (i.e. in-process, complete, reviewed)
The users are allowed to select the query parameters, including, but not limited to:
Date range (sample, result, review)
Sampler
Location
Building
Area
Site
Sample type
Organism
Worklist
Process
Media lot
Equipment
Incubator
Product code Data Transfer/Export
The system provides the capability to perform potential "transfer/export/retrieval" of the system data to other data formats
The potential database formats the system are "compatible" with include:
Microsoft Excel
Microsoft Access
Oracle
SQL Server
Crystal Reports 21 CFR Part 11
Audit Trail
Preferably, the system maintains an automatic (non-user modifiable) audit trail of all modifications made to the system. The audit trail contains the following:
An entry identifying the type of modification made to the database/record, such as additions, deletions, modifications, review, etc.
An entry identifying the user performing the modification to the database/record
An entry noting the date/time of the database/record modification
The date/time included in the audit trail should be retrieved from the server system clock, not the local system clock
The entire database record being modified with the changed fields highlighted
The full manifestation of the name of the user performing the modification
The audit records should be accessible only by authorized users
The audit records should be able to be selected by date and category (component)
The audit records should be reported in an 'easy-to-read' format (view and print)

Electronic Signatures
The system provides the option to require an electronic signature prior to performing any modification to the database/records
The electronic signature requires the entry of the username and password of the user performing the database modification
The electronic signature provides the option to enter information describing the 'meaning' of the signing
The electronic signature prevents the "excising" (cut, copy, paste) of the electronic signature components between signings (i.e., a "link" between the electronic signature and its database record)

FIG. 1 is an illustration of a computer system suitable for use with the present invention. FIG. 1 depicts but one example of the many various computer types or configurations capable of being used with the present invention. This example of a computer system is shown and described in U.S. Pat. No. 5,838,906, which is incorporated herein by reference. FIG. 1 shows computer system 10 including display device 12, display screen 14, cabinet 16, keyboard 18 and mouse 20. Mouse 20 and keyboard 18 are "user input devices." Other examples of user input devices are a touch screen, light pen, track ball, data glove, etc.

Mouse 20 may have one or more buttons such as buttons 22 shown in FIG. 1. Cabinet 16 houses familiar computer components such as disk drives, a processor, storage means, etc. As used in this specification "storage means" includes any storage device used in connection with a computer system such as disk drives, magnetic tape, solid state memory, bubble memory, etc. Cabinet 16 may include additional hardware such as input/output (I/O) interface cards for connecting computer system 10 to external devices such as an optical character reader, external storage devices, other computers or additional devices.

Figure 2:
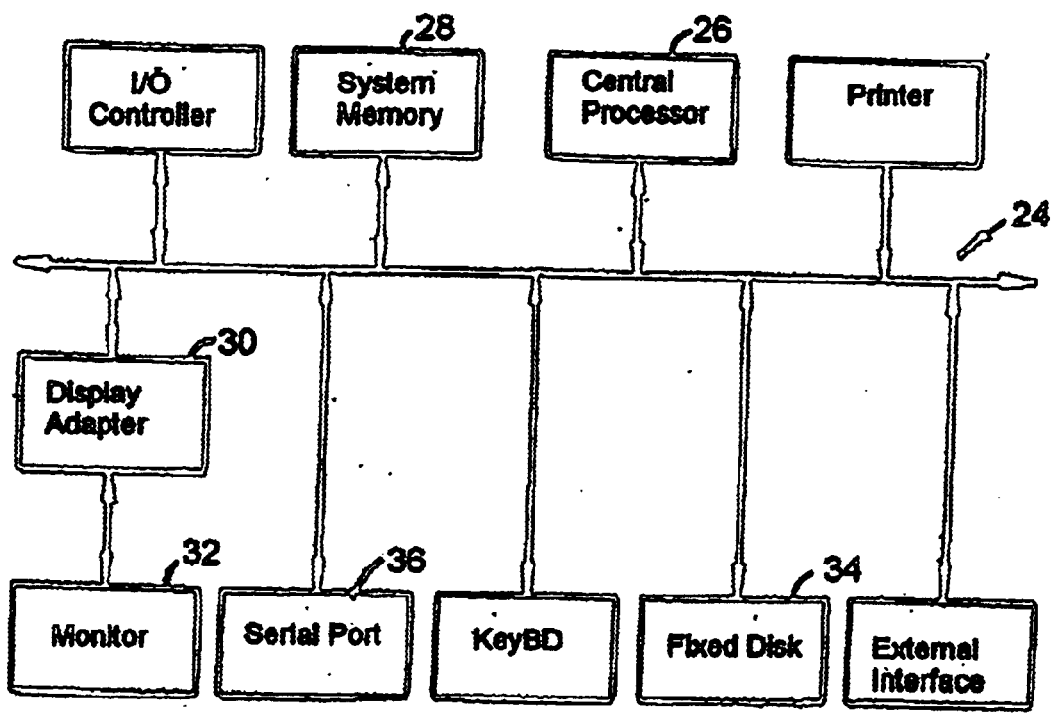
FIG. 2 is an illustration of basic subsystems in the computer system of FIG. 1.

FIG. 2 is an illustration of basic subsystems in computer system 10 of FIG. 1. This example of a subsystem is shown and described in U.S. Pat. No. 5,838,906, which is incorporated herein by reference. In FIG. 2, subsystems are represented by blocks such as central processor 26, system memory 28 consisting of random access memory (RAM) and/or read-only memory (ROM), display adapter 30, monitor 32 (equivalent to display device 12 of FIG. 1), etc. The subsystems are interconnected via a system bus 24. Additional subsystems such as a printer, keyboard, fixed disk and others are shown. Peripherals and input/output (I/O) devices can be connected to the computer system by, for example serial port 36. For example, serial port 36 can be used to connect the computer system to a modem for connection to a network, or serial port 36 can be used to interface with a mouse input device. The interconnection via system bus 24 allows central processor 26 to communicate with each subsystem and to control the execution of instructions from system memory 28 or fixed disk 34, and the exchange of information between subsystems. Other arrangements of subsystems and interconnections are possible.

Figure 3:
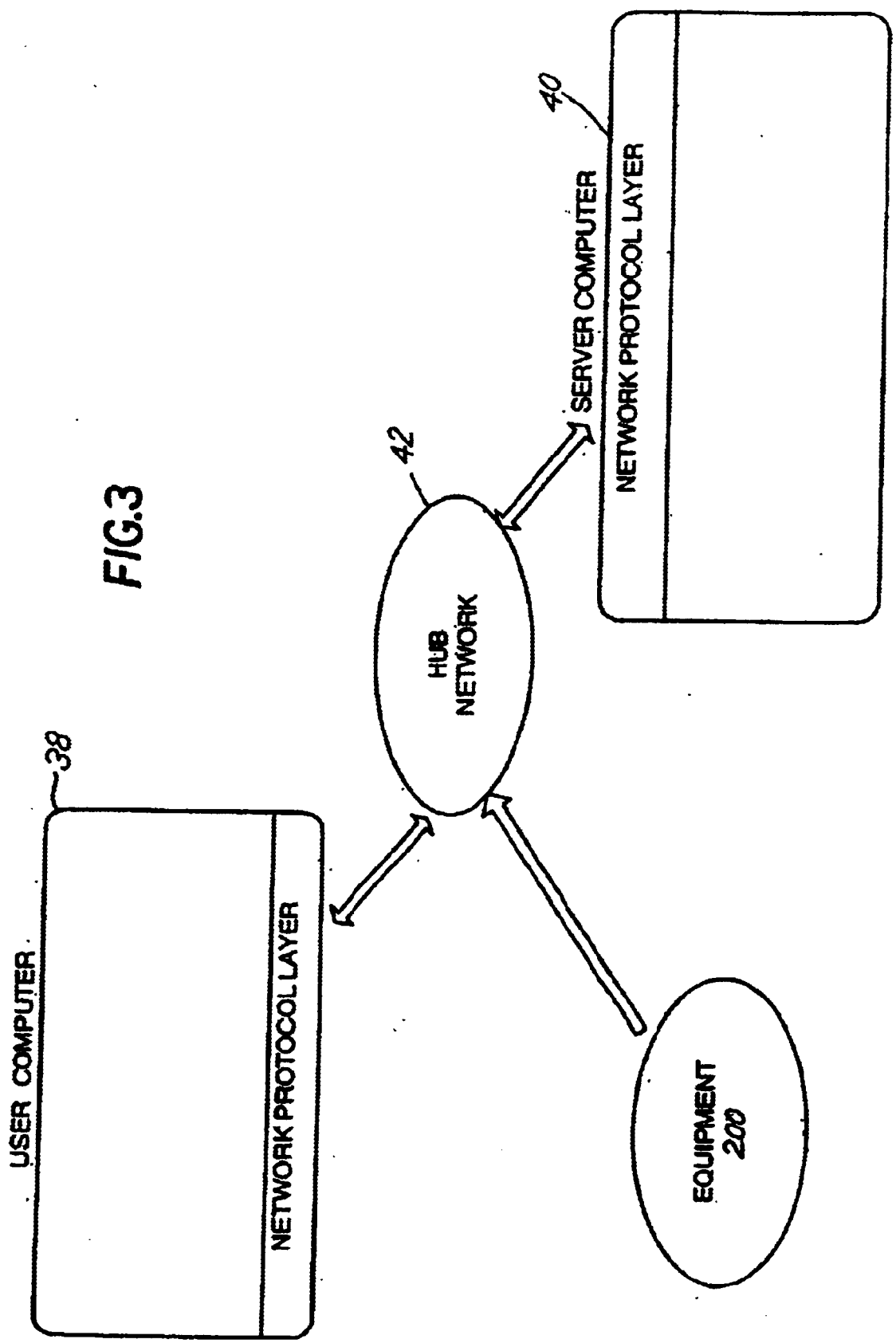
FIG. 3 is an illustration of an embodiment of the invention using a user computer, a server computer and a network.

FIG. 3 is an illustration of an embodiment of the invention using a user computer, server computer and a network. In FIG. 3, user computer 38 communicates with server computer 40 via a universal hub or network 42. Both user computer 38 and server computer 40 use a network protocol layer to communicate with universal hub 42. In a preferred embodiment, universal hub or network 42 is a local area network (LAN) and the network protocol layers are TCP/IP. Other networks and network protocols may be used. For ease of illustration, additional hardware and software layers are not shown in FIG. 3. Universal hub 42 is in communication with equipment 200. Equipment 200 is selected from the group consisting of a particle counter, organism identification system, viable air sampler, facility monitoring equipment (e.g., Heating, Ventilation, Air Conditioning (HVAC) systems, including but not limited to a air flow detector, humidity detector, pressure monitor, and/or thermometer), rapid organism enumeration technology device, bioluminescence device, and water quality detectors, including but not limited to, a pH detector, conductivity detector, total organic content (TOC) detector, endotoxin detector, coliform detector, metal(s) detector, and thermometer. Communication between universal hub 42 and equipment 200 is accomplished by a link device or multi-port data converter shown in FIGS. 12 through 14.

Figure 4:
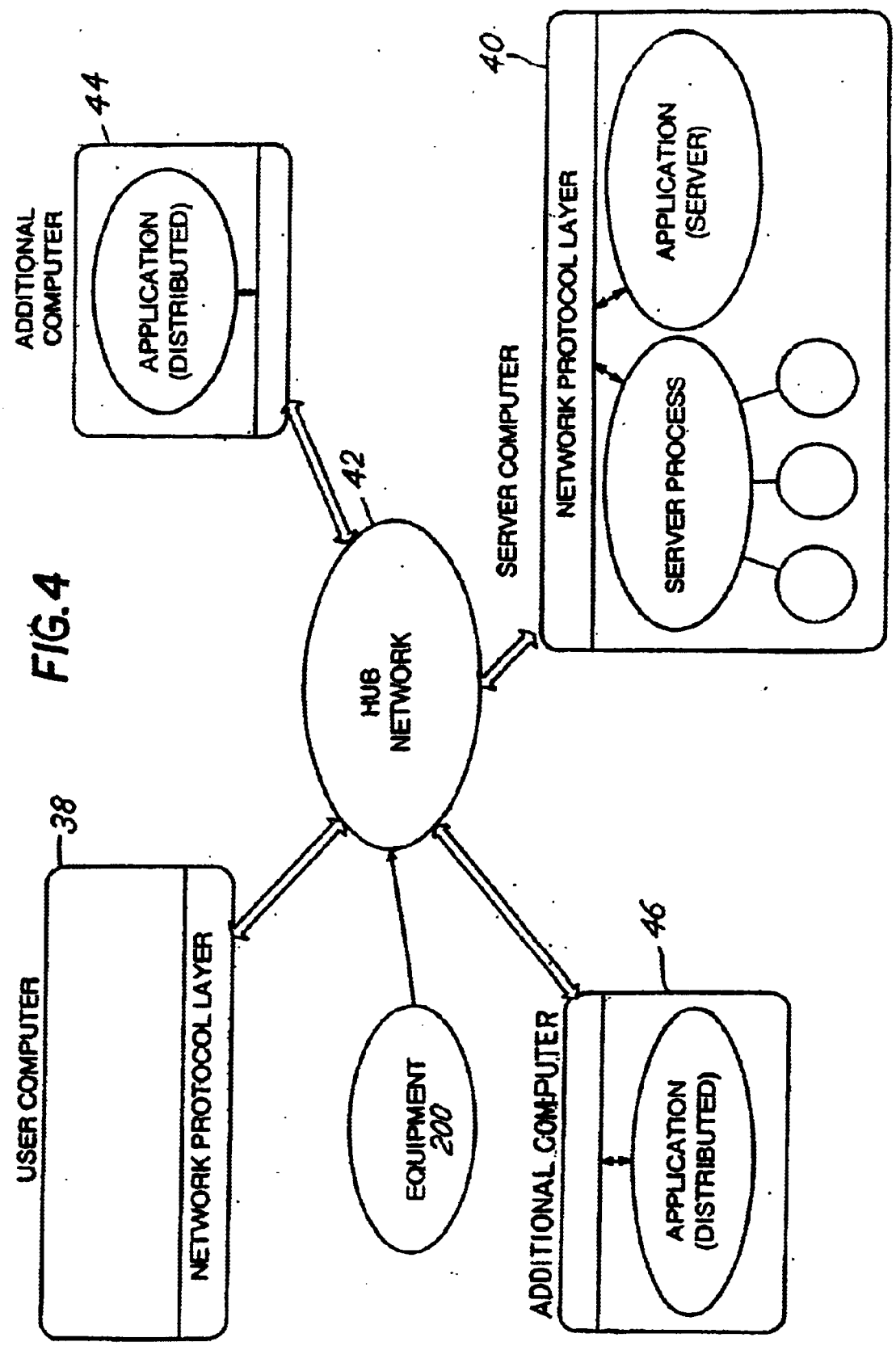
FIG. 4 shows another embodiment of the present invention using additional computers on the network.

FIG. 4 shows yet another embodiment of the present invention. FIG. 4 is similar to FIG. 3, except that additional computers 44 and 46 are illustrated. These computers can be remote from each other on network 42. The coordination of the distributed processing can be performed at user computer 38 by an application client, at server computer 40 by an application server, or by any of the distributed applications executing on additional computers, such as 44 and 46. In a preferred embodiment, distributed processing is coordinated by a program called "VIS" represented by an application client in user computer 38 shown in FIG. 4.

Other applications of the invention are possible. See for example the applications described in U.S. Pat. No. 5,838, 906, which is incorporated herein by reference. For example, the user can operate a spreadsheet program that is being executed by one or more other computer systems connected via the network to the user computer 38. Once the spreadsheet program has calculated results, those results may be sent over the network to user computer 38 for display within a hypermedia document on the user's client computer. In this way, computer systems located remotely on the network can be used to provide the computing power that may be required for certain tasks and to reduce the data bandwidth required by only transmitting results of the computations.

Figure 5:
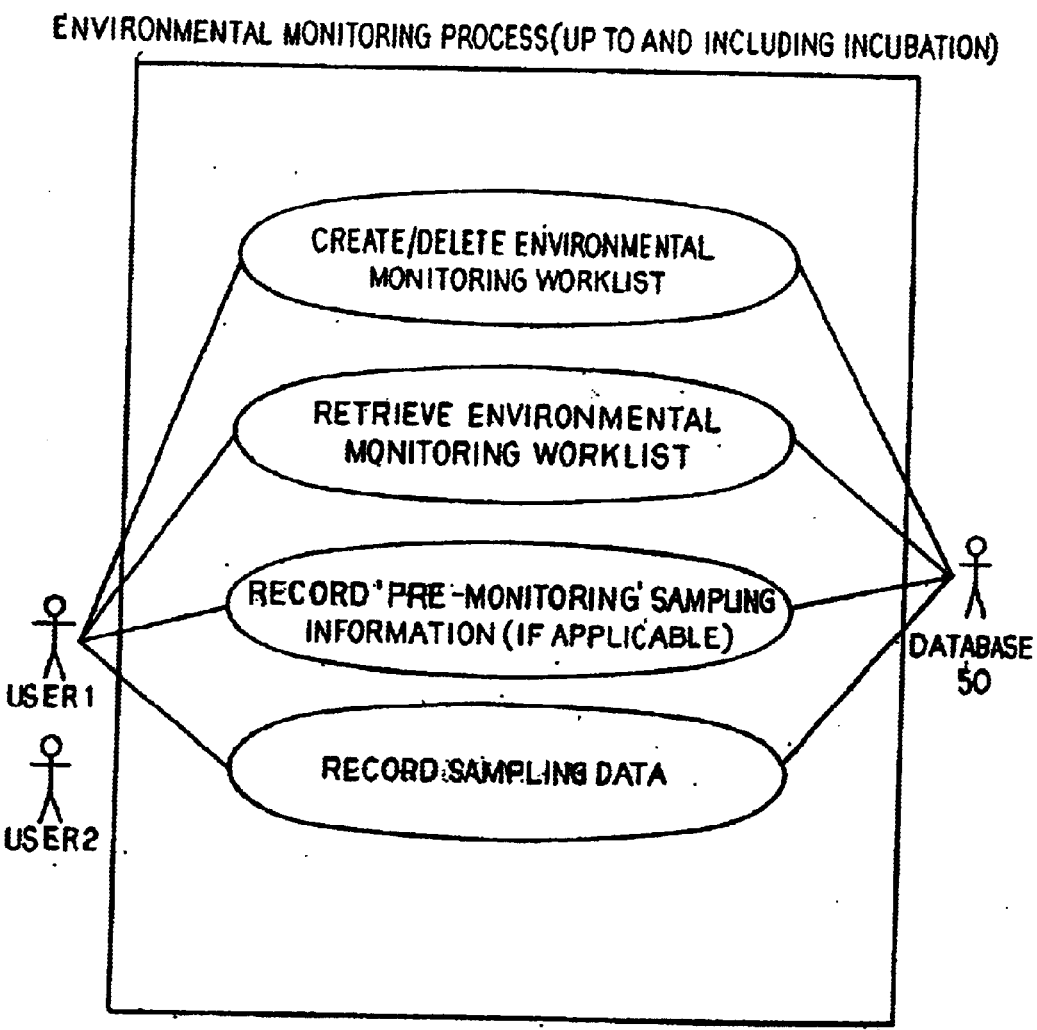
FIG. 5 is a flowchart of certain steps in an embodiment of the present invention, including incubation for microbiological growth in a sample.

FIG. 5 is a flowchart of certain steps in an embodiment of the present invention, including incubation for microbiological growth in a sample. User I creates/deletes items for an environmental worklist from a database 50, and the changes made by User 1 are stored in the database 50. User 1 also retrieves an environmental monitoring worklist from database 50. User 1 records "pre-monitoring sample information (if applicable as may be desired), and these records are stored on database 50. User 1 records sample data, which is stored in database 50. User 2 can access the recorded sampling data from database 50.

Figure 6:
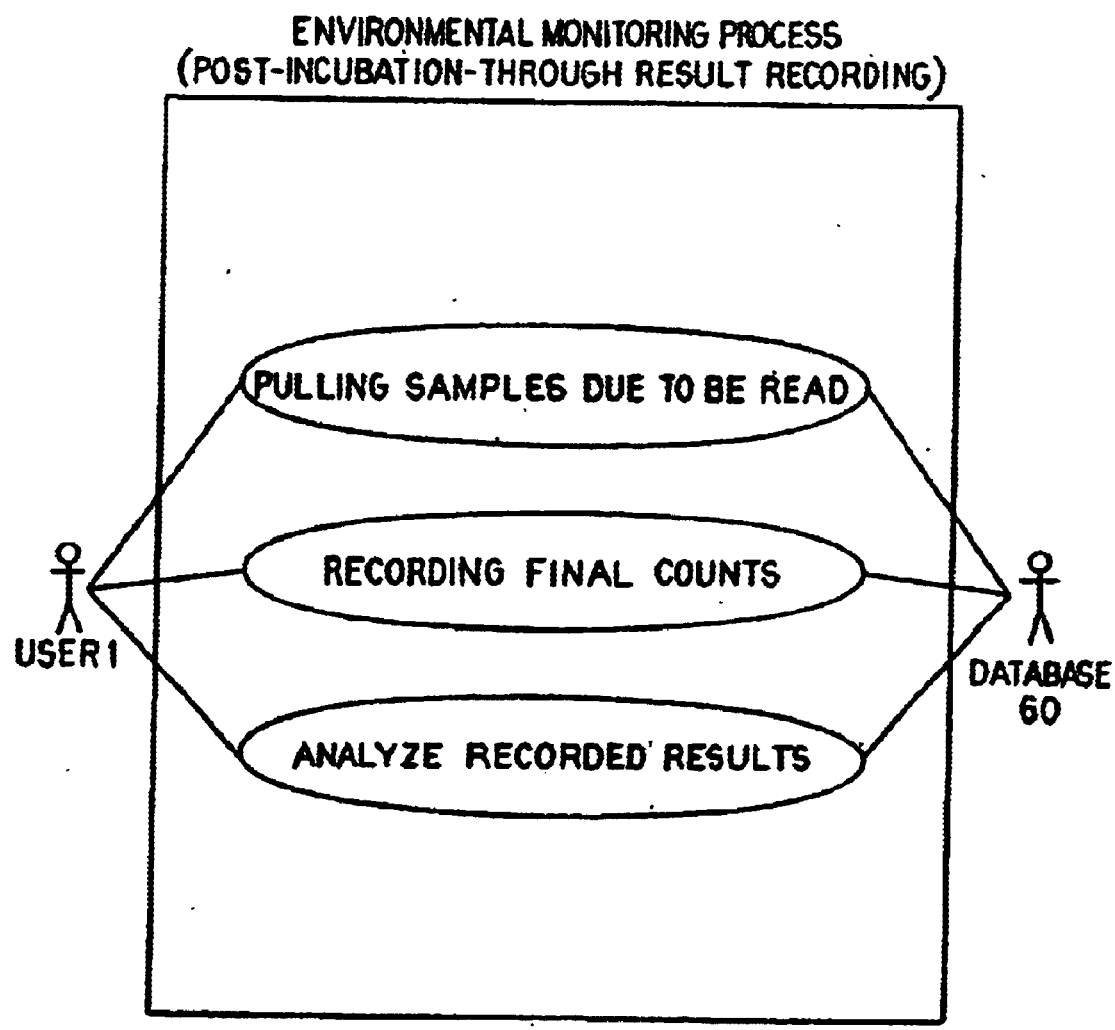
FIG. 6 is a flowchart of certain other steps in an embodiment of the present invention, including post-incubation through result recording.

FIG. 6 is a flownchart of certain other steps in an embodiment of the present invention, including postincubation through result recording. User 1 pulls samples to be read and records final counts, which are stored on database 60. User 1 can analyze the recorded results and/or receive an analysis of the recorded results in accordance with predetermined parameters. Database 60 can be the same as database 50, or can be a different and separate database.

Figure 7:
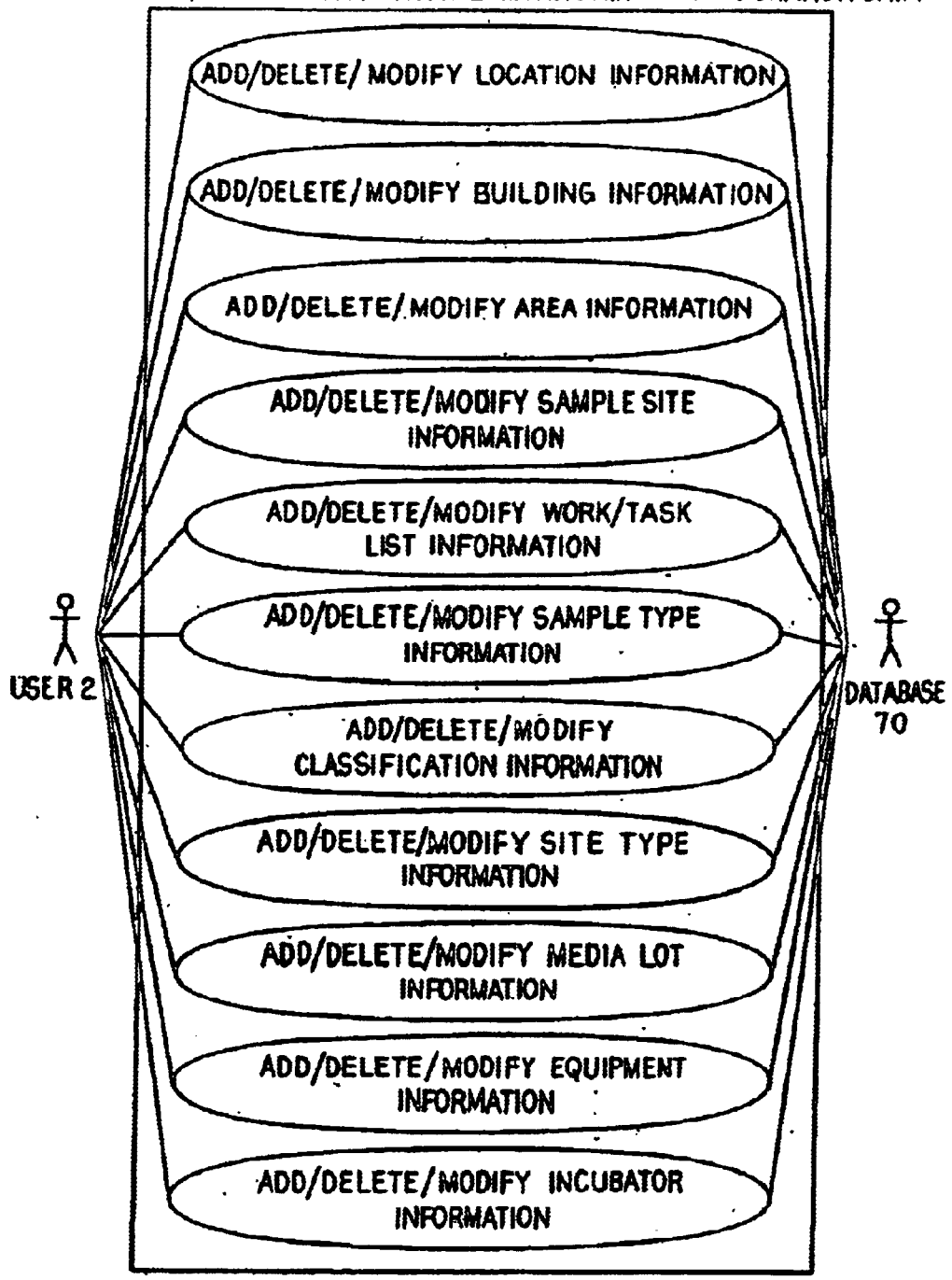
FIG. 7 is a flowchart of configuration data in accordance with an embodiment of the present invention.

FIG. 7 is a flowchart of configuration data in accordance with an embodiment of the present invention. User 2 communicates with database 70, which can be the same as database 50 and/or 60, or can be a different and separate database. User 2 modifies, adds, deletes location information as may be desired. User 2 modifies, adds, deletes building information as may be desired. User 2 modifies, adds, deletes area information as may be desired. User 2 modifies, adds, deletes sample site information as may be desired. User 2 modifies, adds, deletes task list information as may be desired. User 2 modifies, adds, deletes sample type information as may be desired. User 2 modifies, adds, deletes classification information as may be desired. User 2 modifies, adds, deletes site type information as may be desired. User 2 modifies, adds, deletes media lot information as may be desired. User 2 modifies, adds, deletes equipment information as may be desired. User 2 modifies, adds, deletes incubator information as may be desired.

Figure 8:
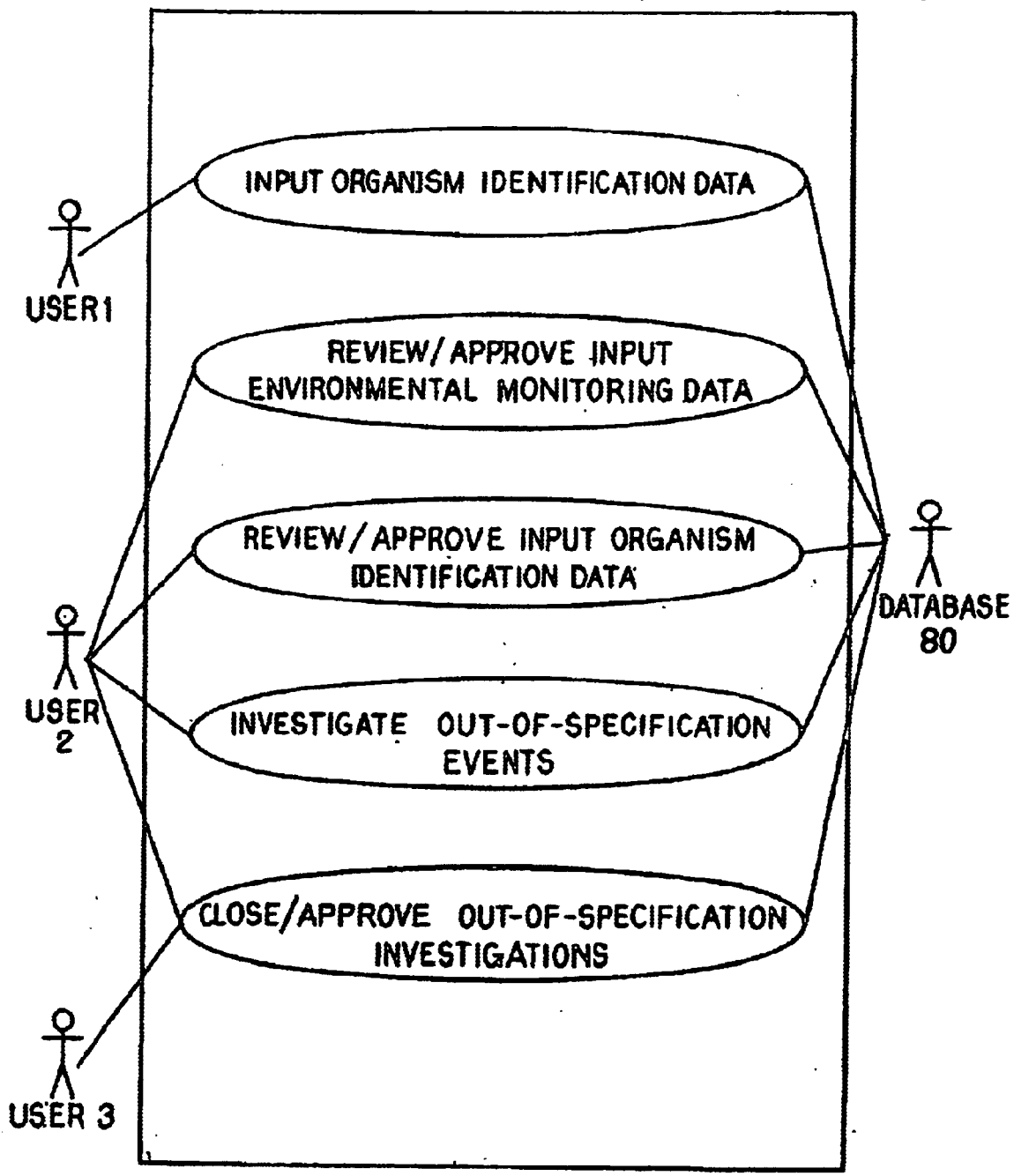
FIG. 8 is a flowchart of post-result entry data in accordance with an embodiment of the present invention.

FIG. 8 is a flowchart of post-result entry data in accordance with an embodiment of the present invention. FIG. 8 shows how Users 1, 2, and 3 communicate with database 80, which may be the same as database 50, 60, and/or 70, or can be a different and separate database. User 1 inputs organism identification data, which is stored in database 80. User 2 reviews and/or approves the input environmental monitoring data, and the input organism identification data. User 2 investigates out-of-specification events. User 2 and/or User 3, closes and/or approves out-of-specifications.

Figure 9:
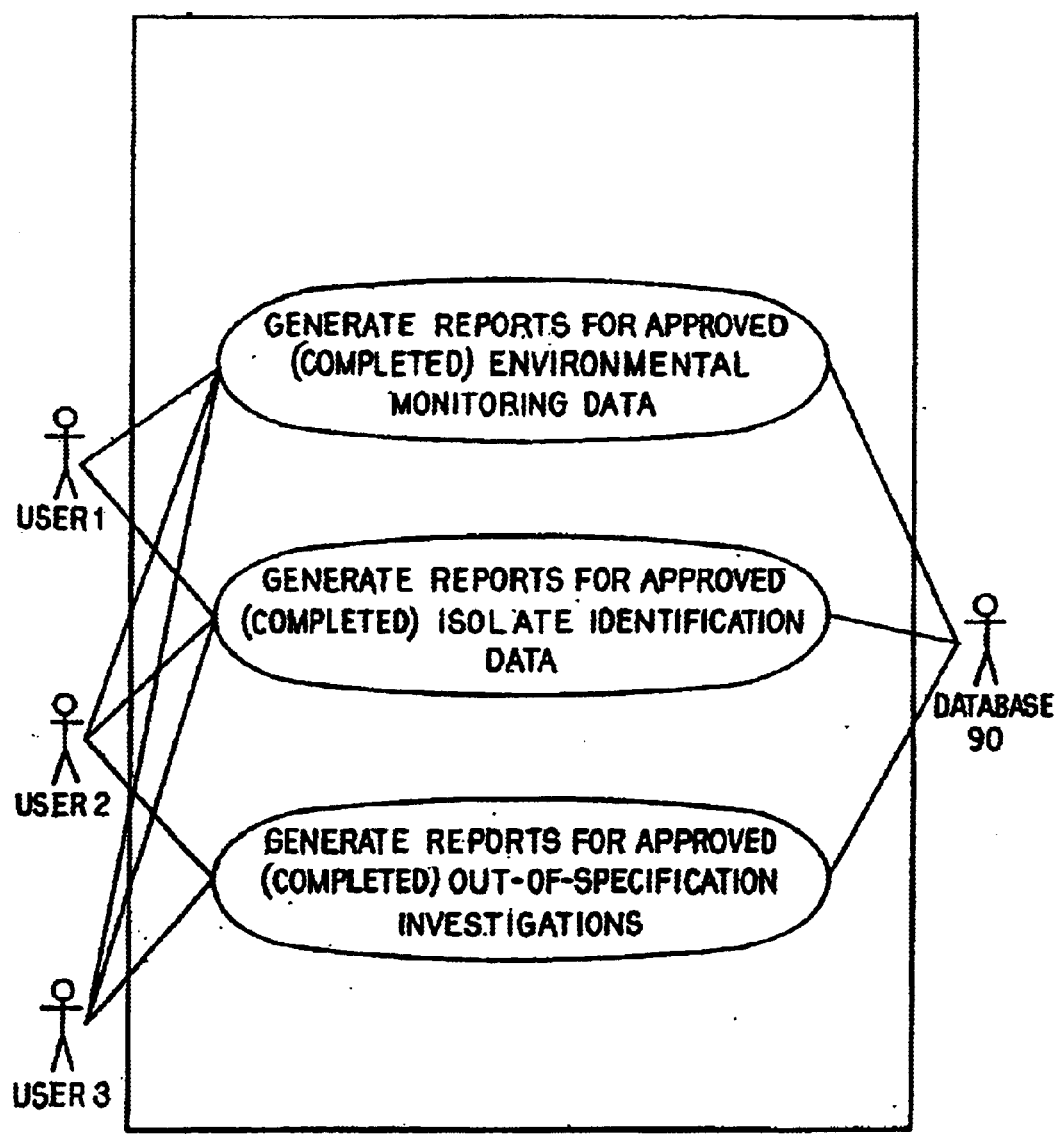
FIG. 9 is a flowchart of reporting data in accordance with an embodiment of the present invention.

FIG. 9 is a flowchart of reporting data in accordance with an embodiment of the present invention. FIG. 9 shows how Users 1, 2, and 3 communicate with database 90, which may be the same as database 50, 60, 70, and/or 80, or can be a different and separate database. Users 1, 2, and/or 3 generates reports for approved (completed) environmental monitoring data and isolate identification data, which is stored in database 90. Users 2 and/or 3 approve (complete) the reports of environmental monitoring data and isolate identification data. Users 2 and/or 3 generate reports for approved (completed) out-of-specification investigations. Users 2 and/ or 3 approve (complete) the reports of out-of-specification investigations.

FIG. 10 is a flowchart of user maintenance/system settings in accordance with an embodiment of the present invention. FIG. 10 shows how Users 2, 3 and 4 communicate with database 100, which may be the same as database 50, 60, 70, 80, and/or 90, or can be a different and separate database. User 2 can manage user access to system (loginusername-password), user roles within the system (e.g., access to specific system functions, and global system settings. Users 3 and/or 4 manage user access to system (login-username-password), user roles within the system (e.g., access to specific system functions, and global system settings.

Figure 11A:
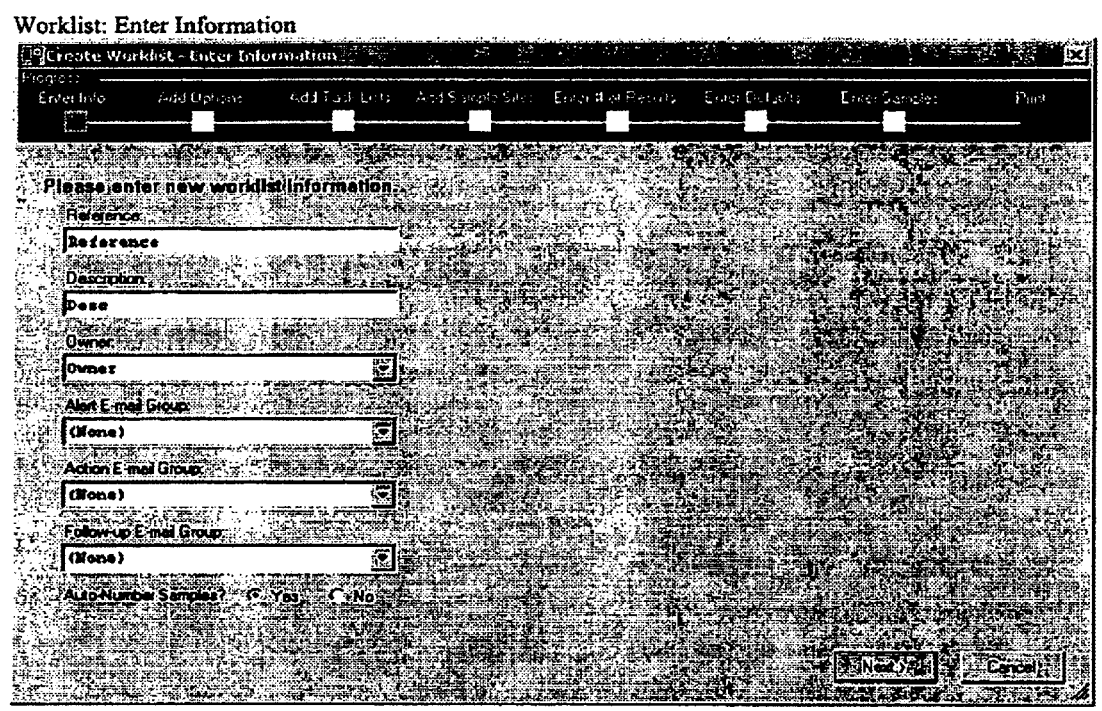
Figure 11B:
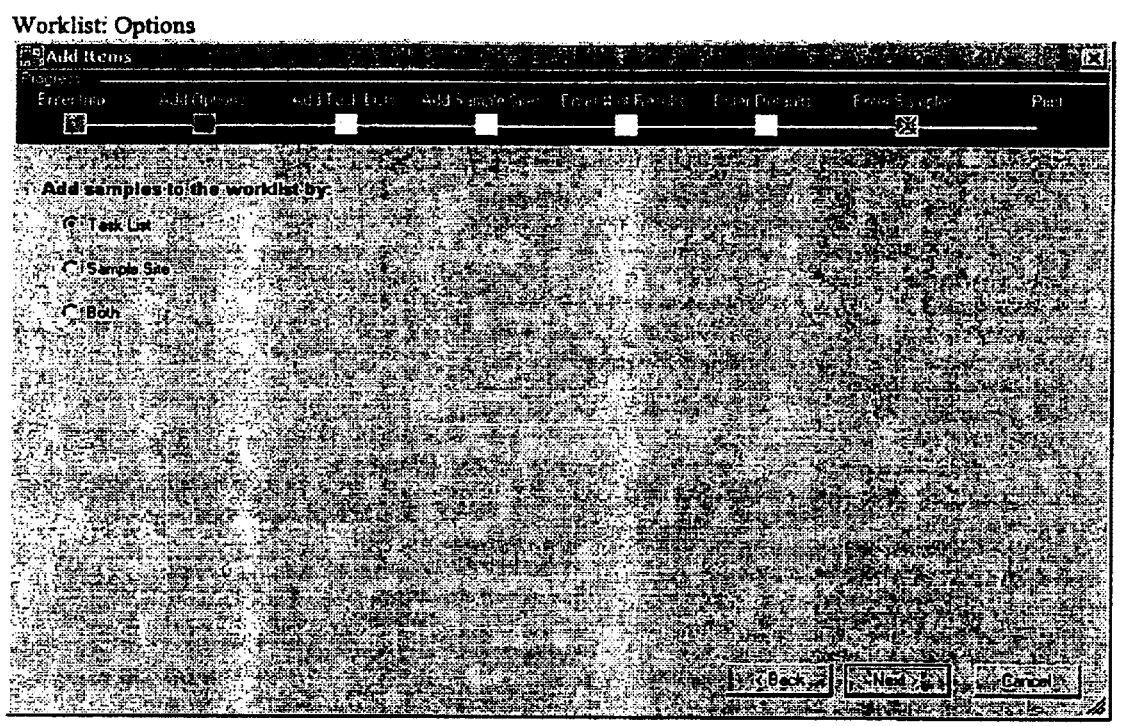
Figure 11C:
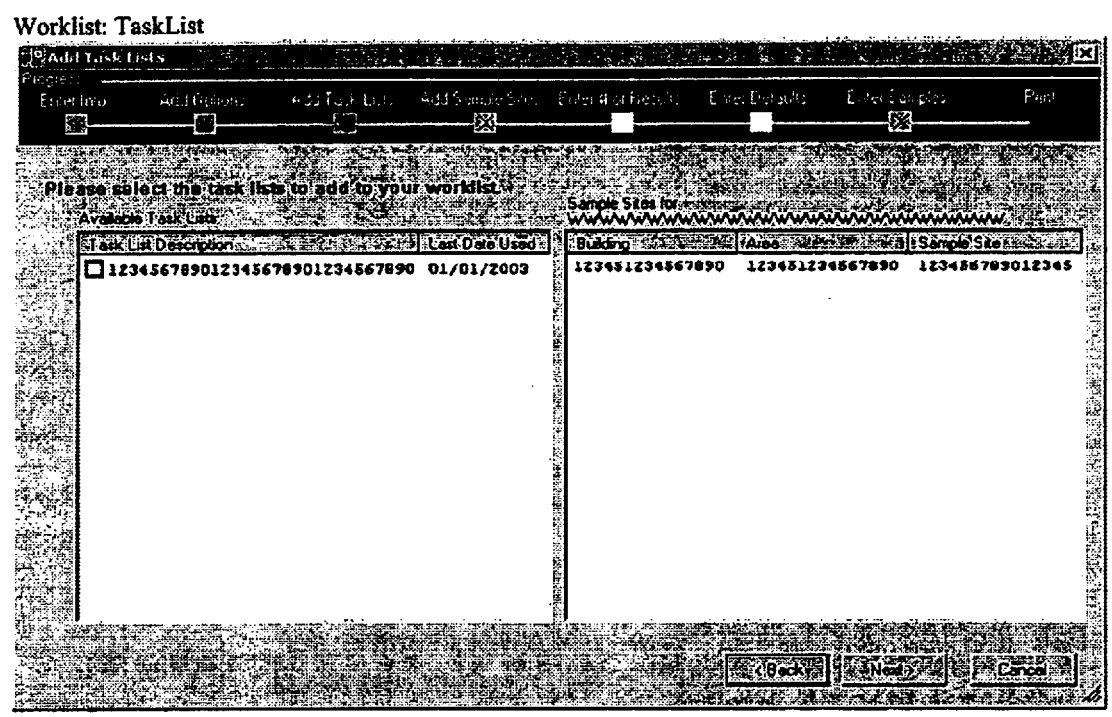
Figure 11D:
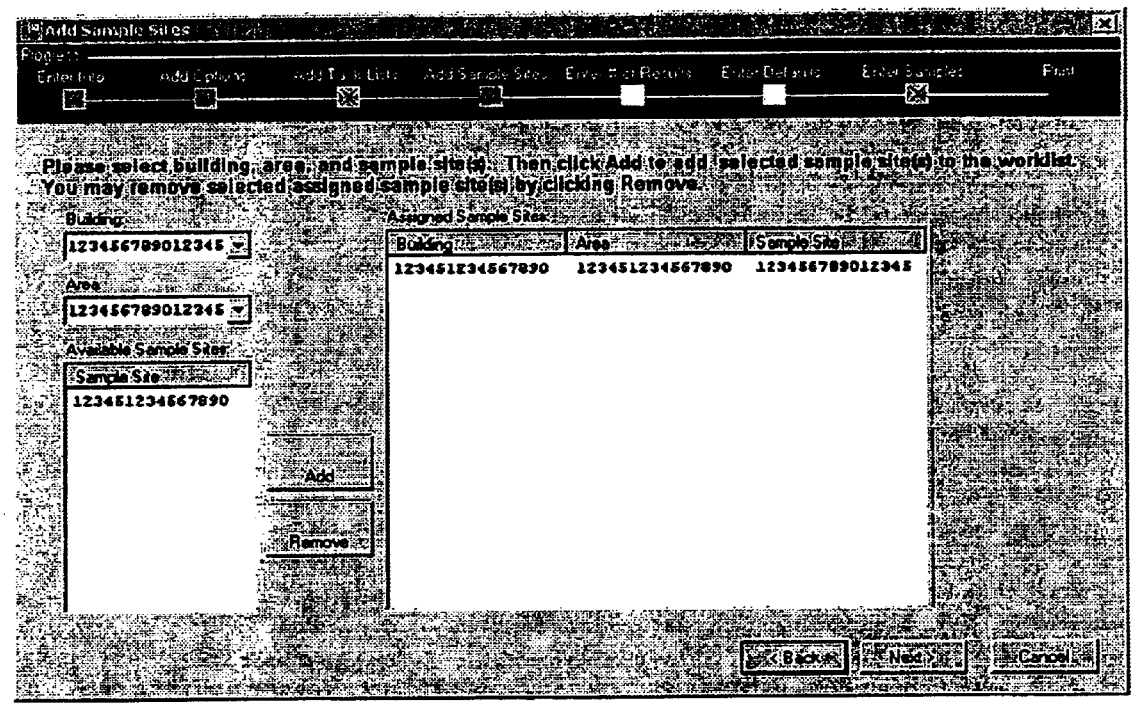
Figure 11E:
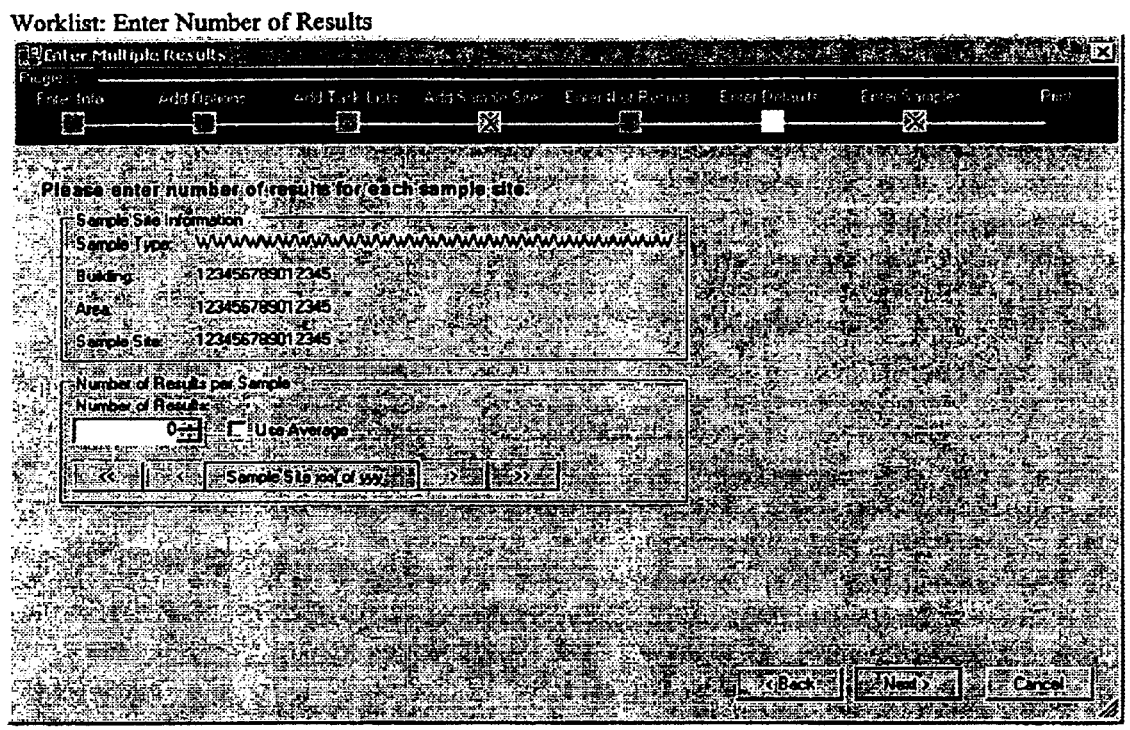
Figure 11F:
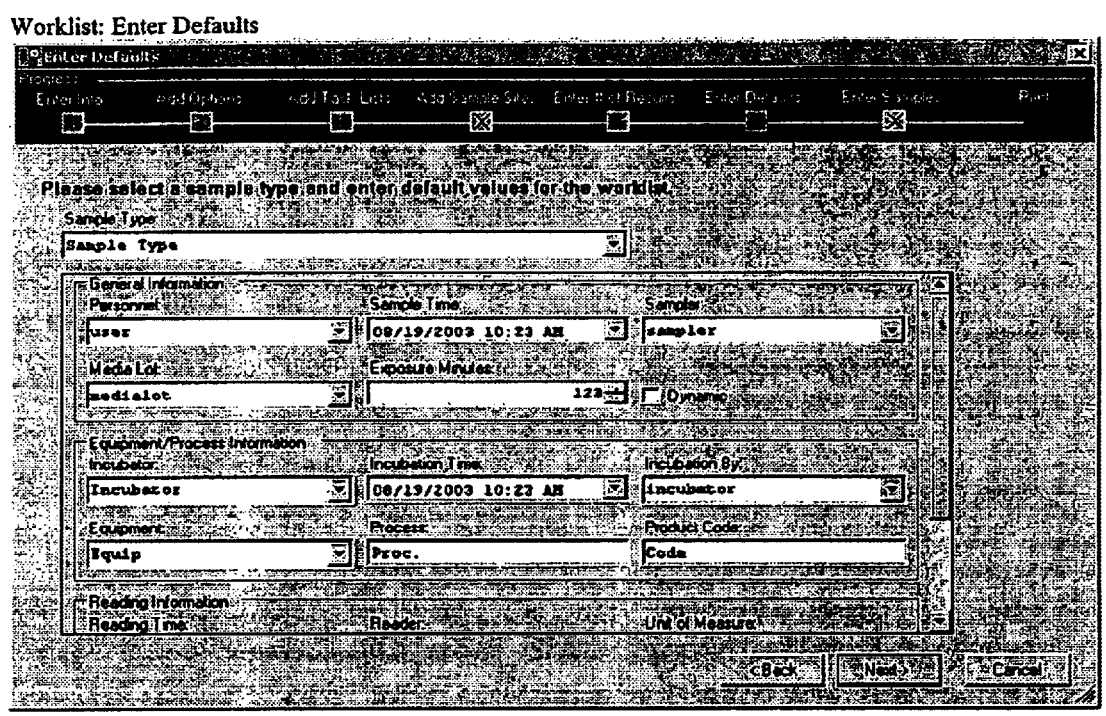
Figure 11G:
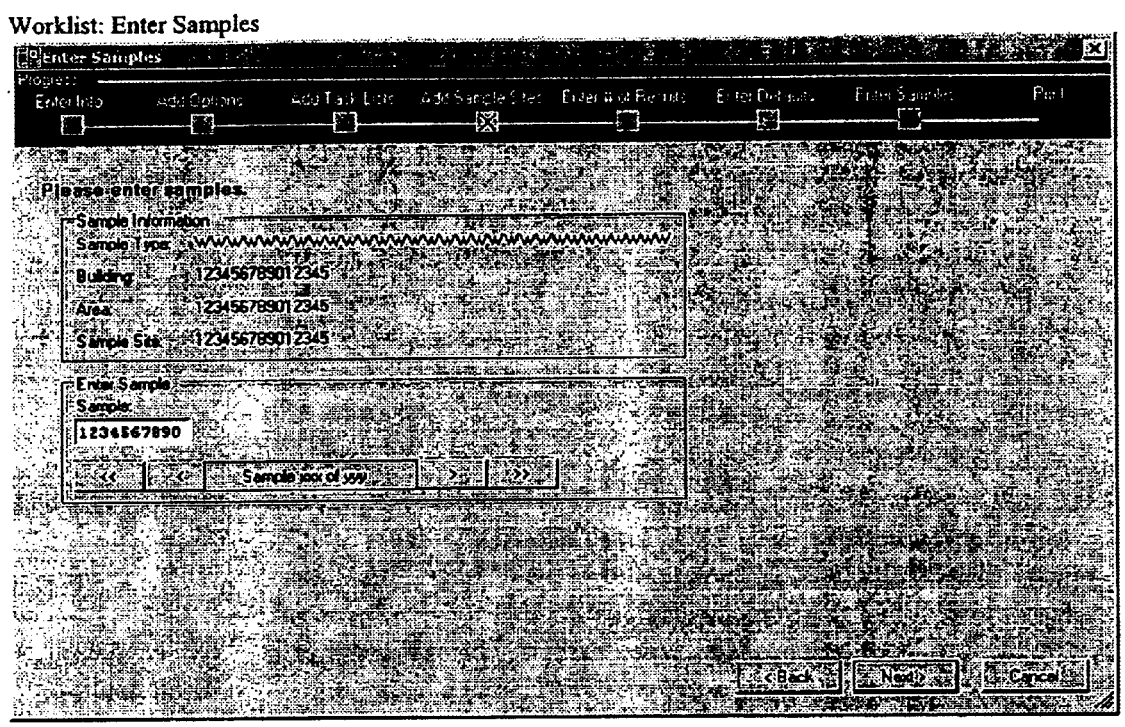
Figure 11H:
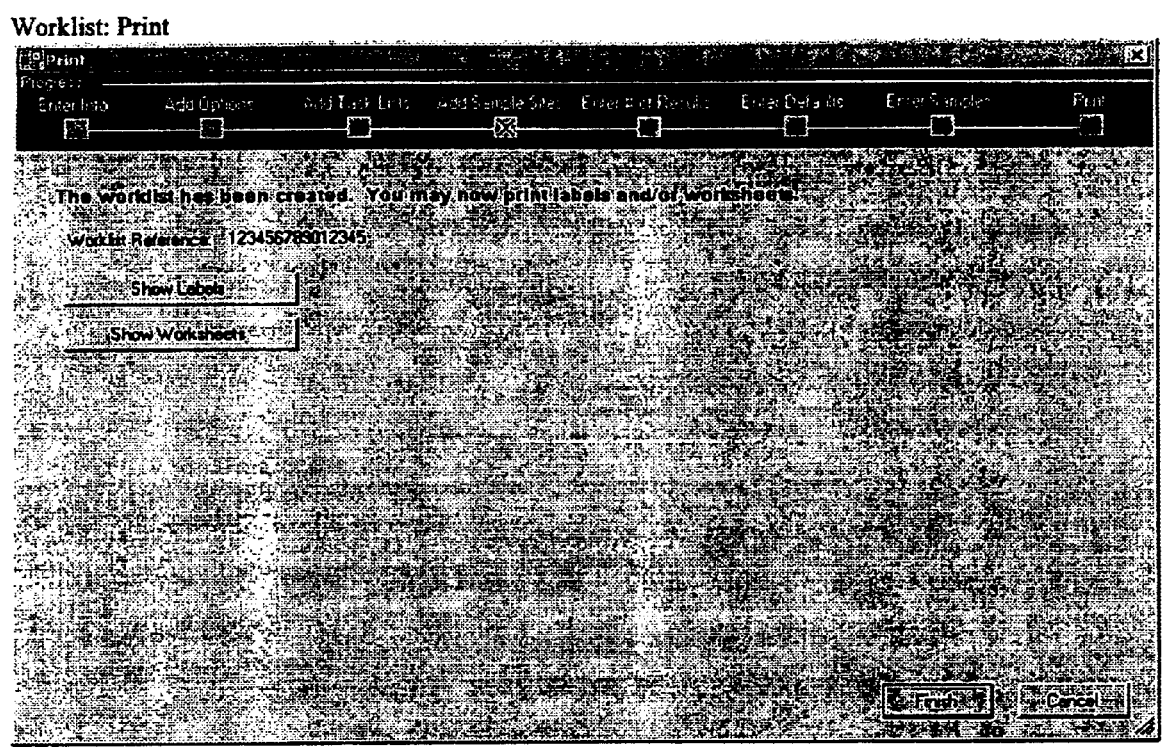
Figure 11I:
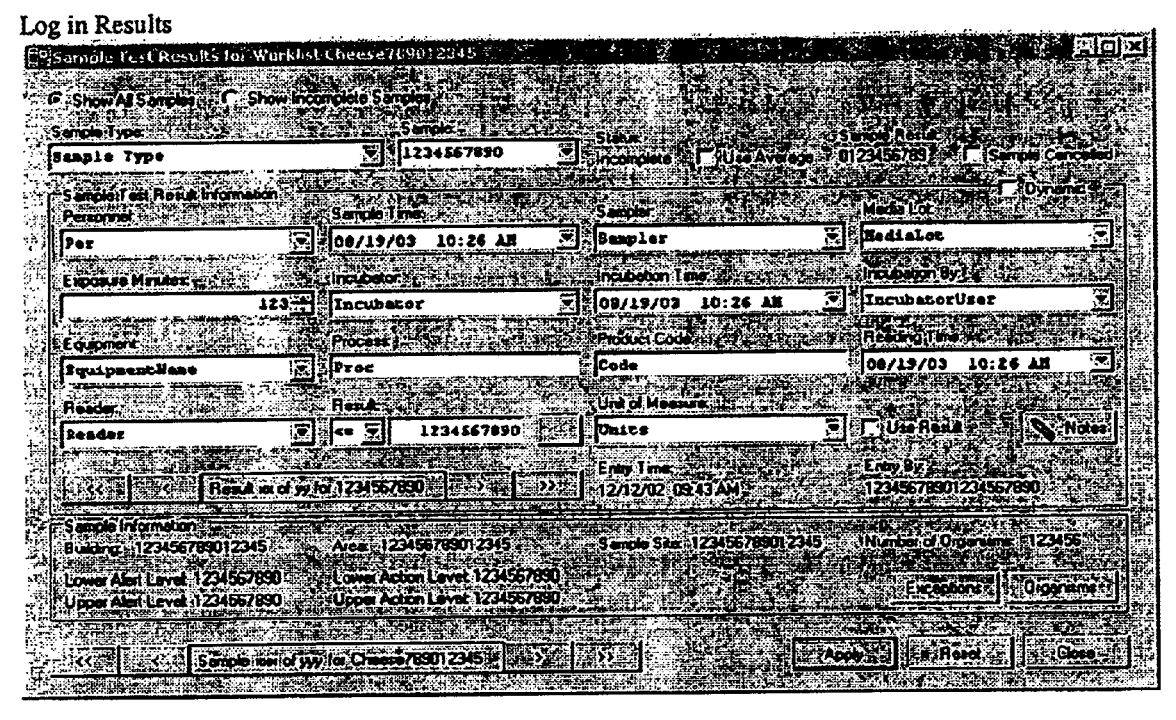
Figure 11J:
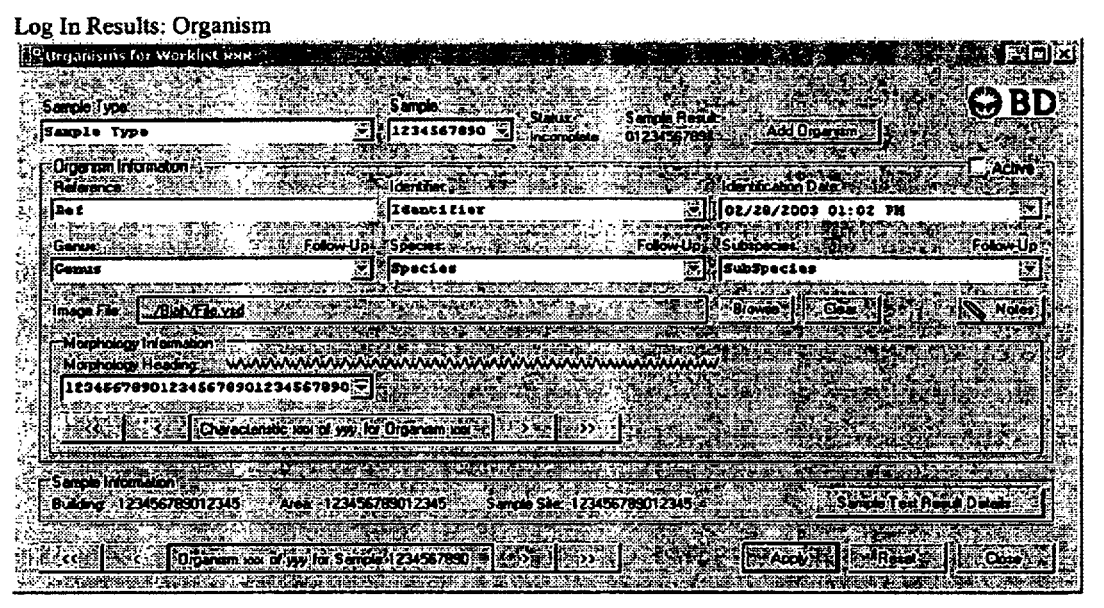
Figure 11K:
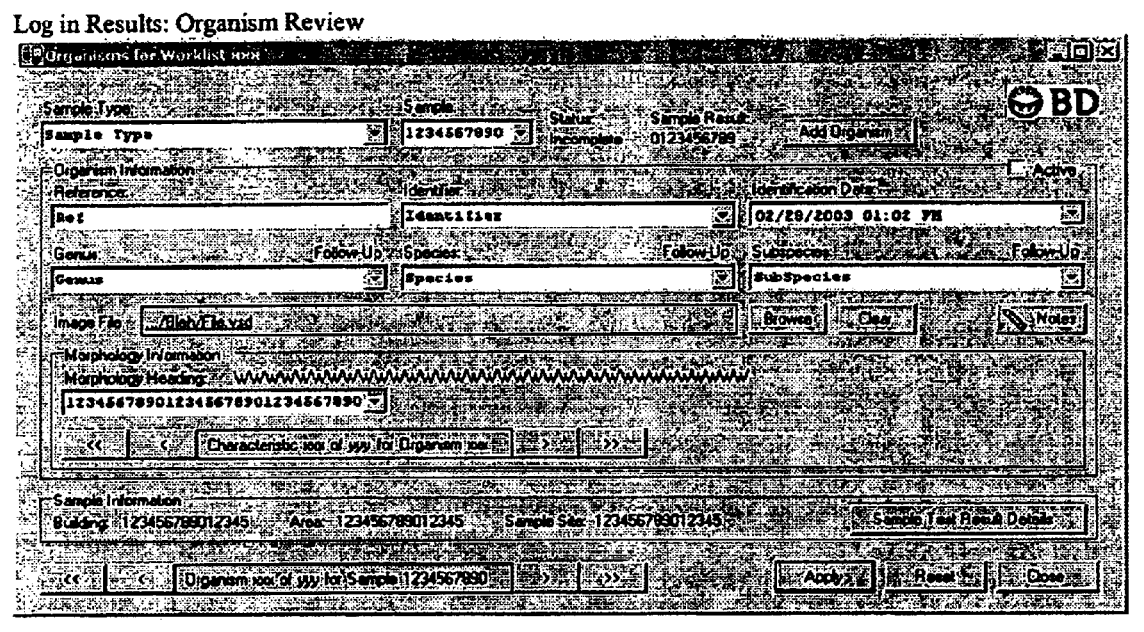
Figure 11L:
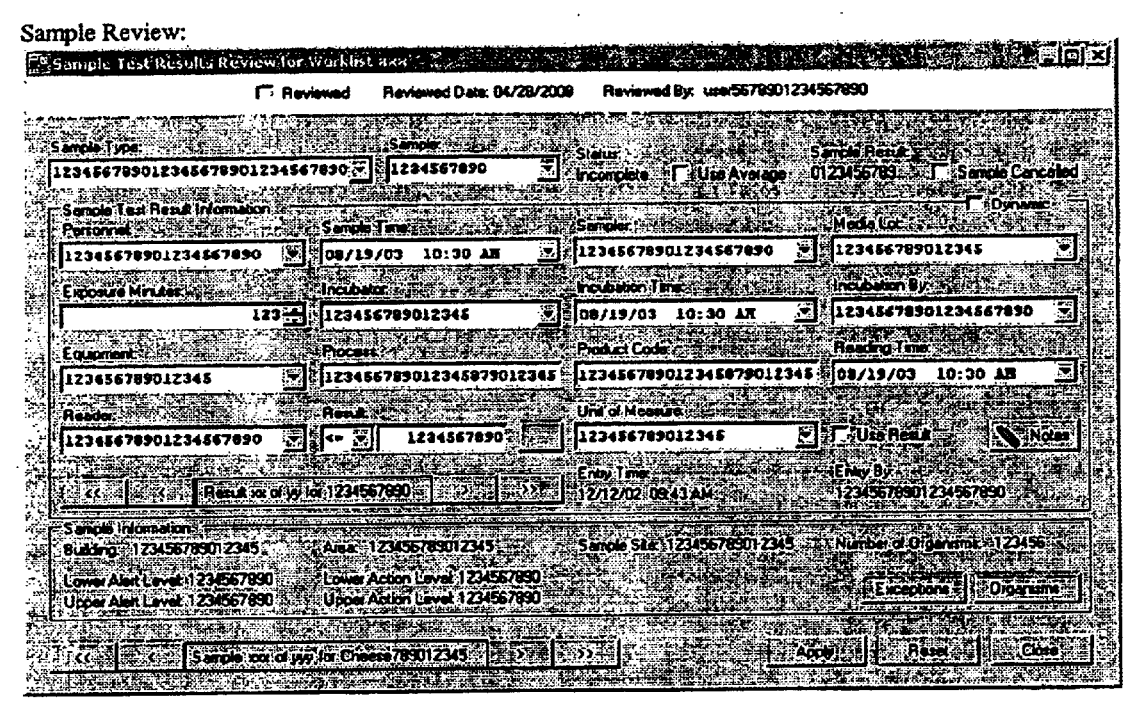

FIGS. 11A through 11L are screen displays generated in accordance with an embodiment of the present invention. As shown in FIG. 11A, a user can enter information identifying the desired worklist. As shown in FIG. 11B, a user can define the method by which the worklist is to be built. As shown in FIG. 11C, a user can define the tasklists used to build the worklist. As shown in FIG. 11D, a user can define the sample sites used to build the worklist. As shown in FIG. 11E, a user can define the number of results to be recorded for each sample in the worklist. As shown in FIG. 11F, a user can enter any default information for the worklist sample sites. As shown in FIG. 11G, a user can enter the sample numbers for the worklist sample sites. As shown in FIG. 11H, a user can print worklist labels and worksheets. As shown in FIG. 11I, a user can enter sample result data for the worklist samples. As shown in FIG. 11J, a user can enter organism data for the worklist samples. As shown in FIG. 11K, a user can enter organism review data for the worklist samples. As shown in FIG. 11L, a user can enter sample result review data for the worklist samples.

Figure 12:
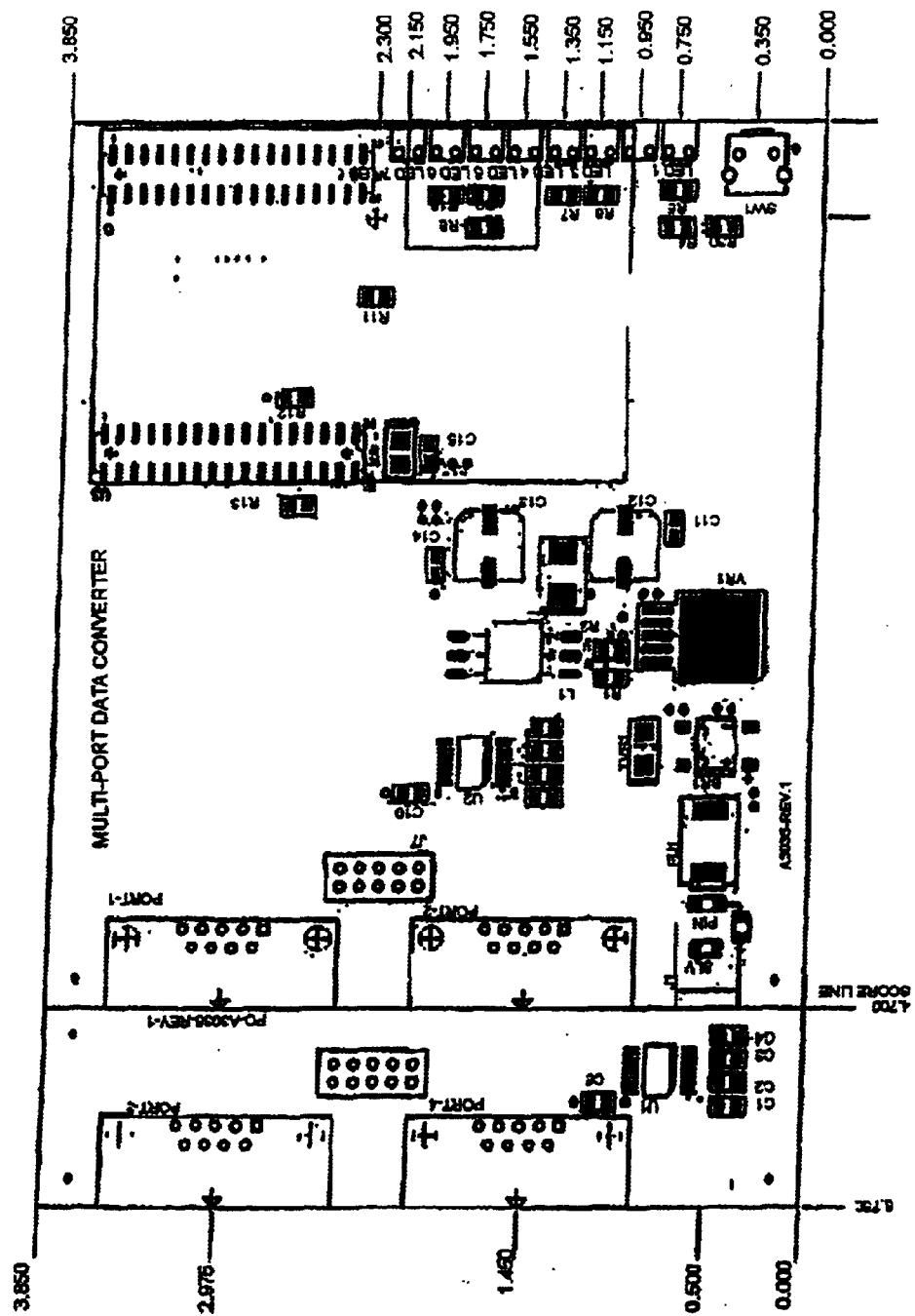
FIG. 12 illustrates a circuit board diagram for a link device or multi-port data converter in accordance with an embodiment of the present invention.

FIG. 12 illustrates a circuit board diagram for a link device or multi-port data converter device in accordance with an embodiment of the present invention.

Figure 13:
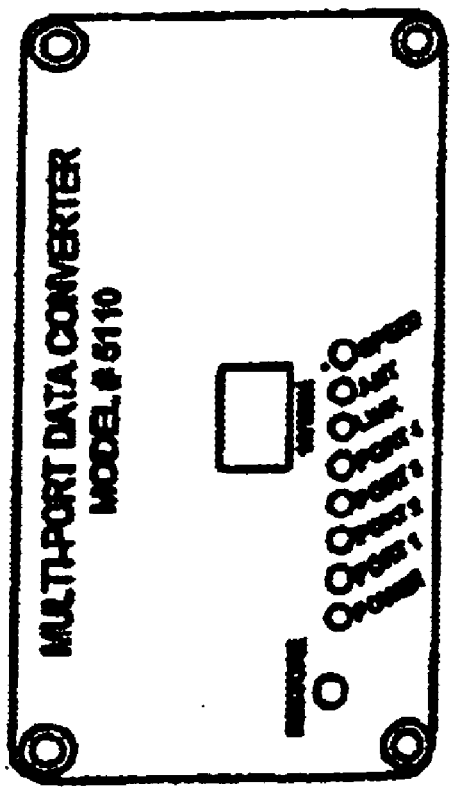
FIG. 13 illustrates the front panel of a link device or multi-port data converter in accordance with the present invention.

FIG. 13 illustrates the front panel of a link device or multi-port data converter in accordance with the present invention.

Figure 14:
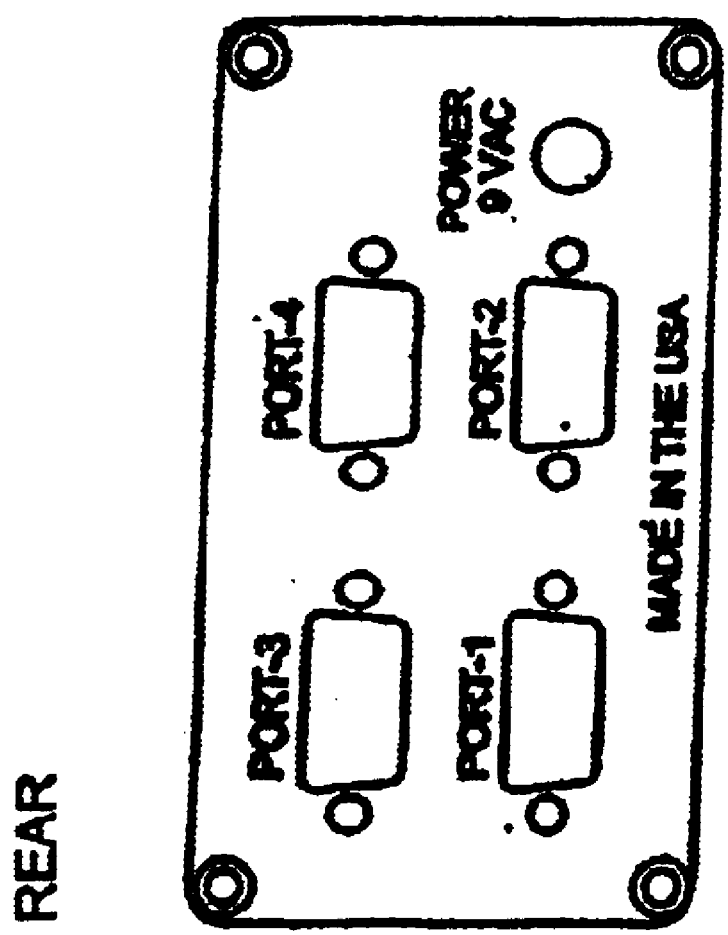
FIG. 14 illustrates the rear panel of a link device or multi-port data converter in accordance with the present invention.

FIG. 14 illustrates the rear panel of a link device or multi-port data converter in accordance with the present invention.

In a preferred embodiment, the software interface specification of a link device or multi-port data converter (or network serial port array) is as follows.

Section 1.—Overview 1.1.

Target Application

The network serial port array includes software targeted for use in any Windows operating system (XP, 2K, NT, Me, 98, 95)

The software library encapsulates the network protocol required to interface to the 4-port network serial devices in a system and give the user application simple read/write and setup functions for interacting with the serial ports.

The software takes the form of a Microsoft "ActiveX control" which is an object that can easily be embedded in a custom Visual Basic application or other forms based application. This includes popular HMI software such as LabView and WonderWare. As an extreme example, it could even be embedded in a Microsoft Excel spreadsheet running macros.

ActiveX controls "reveal" their available commands (methods) and properties to the design environment for the application being built. For example, the VB Toolbox can be modified to include the control, which can then be dropped in to any form.

For Visual C++ programmers and other developers who prefer to use DLLs instead of ActiveX controls, a DLL is also available with identical commands as the ActiveX control. This documentation is intended to describe the ActiveX control.

Also Included

Sample VB Program: A sample Visual Basic NET program that simulates a multi-channel text terminal is supplied that shows how to use the ActiveX control commands. Complete source code is included with step-by-step instructions for how part of it was created.

A Windows utility that allows the user to detect and configure the Network IP addresses of these serial port arrays.

Modes of Operation

The target application must first call setup commands to configure each port that will be used. A port is referenced by the IP address of its controller and the port number (0–3) within the Sport array. Each port can be configured differently.

Configuration options for the ports include Baud-rate, parity start/stop bits etc. But they also include special timing and buffering parameters that effect performance of serial-over Ethernet communications. The application developer may select to use the default parameters and ignore this extra complexity but they are available for fine-tuning of performance.

Sending data is always done in Non-blocking mode. This means that the function call to send the data returns immediately so that the application is not slowed down even though the actual output of the serial bytes will not be completed until several milliseconds later (seconds, if the amount is large).

Receiving data is also done in non-blocking mode. Incoming data can be polled by the outer application or the ActiveX control can be set up to trigger an "event handle" only when data arrives.

Section 2.—Commands

Setup

A separate control instance must be added to the application for each separate serial port. The port is configured by setting its properties and then by calling the enable method to open the serial port.

Property: BaudRate as Integer

Sets the baud rate for the port.

Type Integer, valid values are 2400, 4800, 9600, 14400, 38400.

Default Value=9600

Property: IpAddress as String

Indicates the IP address of the 4-port serial controller that owns this port

Valid values are any network IP address in dot notation like '192.168.1.14'

Default Value=None (Most methods will fail if this is not configured)

Property: PhysicalPort as Integer

Indicates the physical port number within the 4-port serial controller.

Default Value=0, Valid Values 0–3

Property: Parity as integer

Sets Parity handling for the port

0=No Parity, 1=Odd, 2=Even, 3=Mark, 4=Space

Default value=0, No Parity

Property: StopBits as integer

Sets number of stop bits for the port

1=1 Bit, 2=2 bits, 3=1.5 bits

Property: RtsControl as integer

Sets the RTS (Request to send line) behavior. Note, this usually has no effect on simple RS232 communications.

0=Always off, 1=Always On, 2=On only when transmitting (useful for RS485 converters)

Default=2

Method: Enable( ) As Integer

This enables the serial port with a configuration defined by the properties mentioned above. All Send and Receive commands will fail when the port is not enabled successfully. If another NetSerial control in the application (or in another application running on the same network) has already enabled this same physical port on the controller with this same Ip Address, then this call will fail. If IpAddress has not been set prior to calling enable, then the call will fail. If any other setup property has not been set prior to calling enable, then its default value will be used.

Return Value: 1 if successful, 0 if failed. Call GetErrorCode or GetErrorMsg to see detailed information about the failure.

Method: Disable( )

This disables the port. All pending send and receive operations are canceled. The configuration properties can be changed while the port is disabled and will take effect when reenabled.

Sending

Sending over the serial ports is always non-blocking. As soon as any of the commands below are issued, the data is buffered and the function returns immediately. The buffer is then sent out over the serial port.

It is difficult to have precise control over the bytes in a buffer to be sent in Visual basic String handling tools are fooled when a NULL byte is inserted, it is often stripped out. Some string handling routines add modify CR\LF character pairs. If this is not a problem, then the SendString function can be used to send a string's contents over the serial port. If it is a problem, then the SetBuffer and SendBuffer commands can be used to send precisely constructed messages of various binary values.

Method: SendString (theString as String) AS Integer

This accepts the string contents and adds them to the control's transmit buffer to be sent. The function returns immediately without waiting for the transmission to actually be completed. If the previous message has not had enough time to be fully sent, then the current message is put on the end. If the current message must go out immediately without waiting for prior messages, then first call the PurgeTxBuffer method.

Return Value: 1 if successful, 0 if failed. Call GetError-Code or GetErrorMsg to see detailed information about the failure.

Method: SetBuffer (Index AS Integer, theByte AS Byte)

Several of these calls can be used to prepare a buffer to be sent using SendBuffer. Index is a zero-based offset from the start of the buffer and theByte is placed at that index. If an index is skipped in the buffer, then its contents will be whatever was contained there prior to the last SendBuffer command. On startup, the buffer contents are initially all zeros.

Method: SendBuffer (Length AS Integer) AS Integer

This sends the first 'Length' bytes of the buffer that was built up using SetBuffer commands. The buffer used is a special separate buffer just for this command, it should not be confused with the internal transmit buffer. This command behaves just like SendString in how it adds the contents to be sent to any existing messages still in the transmit buffer.

Return Value: 1 if successful, 0 if failed. Call GetError-Code or GetErrorMsg to see detailed information about the failure.

Example: The following set of function calls will send the 4-byte sequence 255, 63, 0, 255 over the serial port.

SetBuffer (0, 255)

SetBuffer (1,63)

SetBuffer (2,0)

SetBuffer (3, 255)

Receiving

Receiving from the serial port is also always non-blocking. ReceiveString, ReceiveBuffer, or ReceiveByte can be called any time to get whatever incoming bytes have been received in the internal receive buffer. These calls return immediately. If nothing has been received then they return zero bytes. CountAvailable returns the number of bytes that are available to be retrieved.

Applications can simply poll incoming bytes by continuously calling ReceiveString or ReceiveBuffer. But the control also has the ability to work asynchronously. Applications can take advantage of the OnReceiveEvent function, which is called whenever a predetermined number of bytes have come in or when a timeout period has expired. The behavior of OnReceiveEvent depends on the parameters used in a call to RequestReceive or AlwaysReceive.

Method: ReceiveString (MaxLength AS Integer) As String

This command takes whatever has recently been received in the receive buffer up to MaxLength and returns it as a string. If there are more than MaxLength bytes waiting in the receive buffer, then these will remain in the buffer after the function call and can be retrieved later with another ReceiveString call.

If no bytes are available then an Empty string is returned.

Method: ReceiveBuffer (MaxLength AS Integer) AS Integer

This command takes whatever has recently been received in the receive buffer up to MaxLength and copies it to a special buffer where it can be analyzed using calls to GetBufferAt. This can be useful for parsing messages that contain bytes, which are not easily manipulated as strings in VB.

Returns the number of bytes actually copied and available for use by GetBufferAt commands. If nothing has been received lately, then this function returns zero.

Method: ReceiveByteo AS Integer

This returns the next byte in the receive buffer. This can be called repeatedly to read an incoming message one byte at a time. When the receive buffer is empty, the integer result is −1 (similar to end-of-file).

Returns −1 if there are no more bytes to read, otherwise returns the byte value 0–255.

Method: GetBufferAt(Index AS Integer) AS Integer.

This is used after a call to ReceiveBuffer to examine the buffers contents. Index is a zerobased offset from the start of the buffer to be returned. Care should be taken not to specify an index that is past the number of bytes actually copied in the call to ReceiveBuffer because this can return an undefined value.

Returns −1 if the specified index is past the end of what was actually buffered, otherwise returns the byte value 0–255.

Method: CountAvailable( ) AS Integer

This returns the number of bytes waiting in the receive buffer that can be read using ReceiveBuffer, ReceiveString, or repeated calls to ReceiveByte.

Method: PurgeRxBuffer( ) As Integer

This clears any unread contents out of the receive buffer. Thus the next call to ReceiveString or ReceiveBuffer will return no new bytes.

Returns the number of unread bytes that were in the buffer before it was cleared.

Asynchronous Receiving

Method: RequestReceive(Length AS Integer, Timeout AS Integer)

This function tells the control to begin receiving the number of bytes requested by the Length parameter and to trigger the application's OnReceiveEvent handler function when they have come in. If the specified Timeout value (in milliseconds) elapses before the requested number of bytes is received, then the OnReceiveEvent handler is triggered as well.

Within OnReceiveEvent, the application can look at the RequestStatus property to determine if the request ended because of a timeout or because all of the requested bytes were received. The application can also call CountAvailable to determine how many bytes were actually received. If this is less than the number requested, then a timeout can be assumed.

If the Timeout value is zero, this is interpreted as an Infinite timeout. Thus if no bytes come in, OnReceiveEvent will never be triggered.

RequestReceive is considered a one-shot function. OnReceiveEvent will only be triggered once for each call to RequestReceive. If more bytes come in afterwards, OnReceiveEvent will not be triggered again (as they are in AlwaysReceive—see below) If RequestReceive is called again before the last call was completed, the last request is simply cancelled.

Property: RequestStatus AS Integer

This property can be read to determine the status of the last RequestReceive command.

0=Request is not yet complete. The timeout has not expired and the requested number of bytes has not yet been received.

1=Requested number of bytes have been received and can be read using ReceiveString etc.

2=Timeout expired before the requested number of bytes could be received.

3=Communication error with the controller—possibly loss of a network connection or no power to the controller.

Method: AlwaysReceive (MaxBlockLength AS Integer, GapTime AS Integer)

This tells the control to begin continuously receiving bytes and continuously notifying the application of new arrivals by triggering OnReceiveEvent (see above)

If the bytes come in and then the receive line goes silent for longer than GapTime (milliseconds), then this is considered a separate incoming message and OnReceiveEvent is triggered.

If bytes are streaming in without a gap, then every time MaxBlockLength bytes have been received, OnReceiveEvent is called.

Within OnReceiveEvent, CountAvailable can be called to see how much has actually come in. The RequestStatus property will always be 0 unless there is a network problem in which case the value will be 3.

Method: StopAlwaysReceive( )

This cancels the AlwaysReceive mode which may be in progress and stops this from triggering OnReceiveEvent until AlwaysReceive or RequestReceive is called again Event: OnReceiveEvent( )

As described in various cases above, this event is triggered in the end application in response to AlwaysReceive and RequestReceive commands when requested number of bytes is received.

Section 3.—Application Development

Adding to a VB.NET application

Run the quick setup program to register the control on the computer being used to develop the application. VB will handle redistribution automatically. This will not need to be done on the enduser's computer.

Under the Tools menu, select "Customize Toolbox".

Under the "Com Components" screen, locate the "NetSerial" control. Click its checkbox, and click OK.

The NetSerial control should now be available in the Windows Forms pane in the Forms toolbox for the visual basic project.

Add multiple NetSerial controls to one of the Forms in the project.—One for each port that will be used.

Resize these controls to be very small. The control is intended to be non-visible, but if it is left visible, it will display a small activity indicator icon when serial communications are taking place. Select the control and change its Visible Property to suit View Code for the form and on the select any of the NetSerial components that were just added, and then select OnReceiveEvent from the declarations drop list. This adds a serial event handler function to the form which will be triggered when non-blocking read/write events are completed for that port.

Function calls can be made to any of the NetSerial member functions for setup, reading, and writing.

SendBuffer(4)

Method: PurgeTxBuffero As Integer

This clears any unsent contents out of the transmit buffer. Thus the next call to SendString or SendBuffer will begin sending its contents out immediately.

Returns the number of unsent bytes that were in the buffer before it was cleared.

The embodiments of the invention, and the invention itself, are now described in such full, clear, concise and exact terms to enable a person of ordinary skill in the art to make and use the invention. To particularly point out and distinctly claim the subject matters regarded as invention, the following claims conclude this specification. To the extent variations from the preferred embodiments fall within the limits of the claims, they are considered to be part of the invention, and claimed.

What is claimed:

1. A data management system having a universal hub in electronic communication with at least one piece of equipment used to automatically measure environmental data, the system configured to collect and store the environmental data, and generate a user report of the environmental data, the equipment selected from the group consisting of a particle counter, organism identification system, viable air sampler, rapid organism enumeration technology device, bioluminescence device, and water quality detector, the user report providing document compliance with U.S. Food and Drug Administration requirements.

2. The data management system of claim 1, wherein the facility monitoring system is from the group consisting of a HVAC monitoring system, air flow detector, humidity detector, pressure monitor, and thermometer.

3. The data management system of claim 1, wherein the water quality detector is selected from the group consisting of pH detector, conductivity detector, total organic content detector, endotoxin detector, coliform detector, metal detector, and thermometer.

4. The data management system of claim 1 wherein the U.S. Food and Drug Administration requirements are electronic records and electronic signature requirements.

5. The data management system of claim 1 wherein the U.S. Food and Drug Administration requirements are set forth in United States 21 CFR Part 11.

6. The data management system of claim 1 wherein the report is a configurable report having configurable records selected from the group consisting of data records to include, displayed fields, sort and grouping of data records, and formatting of data via a table, bar chart, pie chart, or other visual display.

7. The data management system of claim 1 further configured to allow a user to configure access of a specific individual with access to a predetermined specific system function.

8. The data management system of claim 1 wherein the electronic communication between the hub and the equipment is accomplished by a link device that interfaces with the equipment used to measure the environmental data.

9. A data management system having a universal hub, the universal hub interfacing with at least one add-on software module for specialized tracking of data unique for a particular manufacturing facility, the data selected from the group consisting of media growth promotion, sterility testing, media fills, bioburden, equipment maintenance and calibration, annual report, antibiotic assay, biological indicator, corrective and preventative action, cleaning and disinfection validation and tracking, container closure integrity, endotoxin testing, filter integrity, package integrity, preservative effectiveness testing, and smoke studies, the system configured to collect and store the data, and generate a user report of the data, the user report providing document compliance with U.S. Food and Drug Administration requirements.

10. The data management system of claim 9 wherein the U.S. Food and Drug Administration requirements are electronic records and electronic signature requirements.

11. The data management system of claim 9 wherein the U.S. Food and Drug Administration requirements are set forth in United States 21 CFR Part 11.

12. The data management system of claim 9 wherein the report is a configurable report having configurable records selected from the group consisting of data records to include, displayed fields, sort and grouping of data records, and formatting of data via a table, bar chart, pie chart, or other visual display.

13. The data management system of claim 9 further configured to allow a user to configure access of a specific individual with access to a predetermined specific system function.

14. A data management system having a universal hub in electronic communication with at least one piece of equipment used to automatically measure a first set of data, the system configured to collect and store the first set of data, and generate a first user report of the first set of data, the equipment selected from the group consisting of a particle counter, organism identification system, viable air sampler, rapid organism enumeration technology device, bioluminescence device, and water quality detector, the universal hub interfacing with at least one add-on software module for specialized tracking of a second set of data, the second set of data unique for a particular manufacturing facility, the second set of data selected from the group consisting of media growth promotion, sterility testing, media fills, bioburden, equipment maintenance and calibration, annual report, antibiotic assay, biological indicator, corrective and preventative action, cleaning and disinfection validation and tracking, container closure integrity, endotoxin testing, filter integrity, package integrity, preservative effectiveness testing, and smoke studies, the system configured to collect and store the second set of data, and generate a second user report of the second set of data, the first and second user reports providing document compliance with U.S. Food and Drug Administration requirements.

15. The data management system of claim 14, wherein the facility monitoring system is from the group consisting of a HVAC monitoring system, air flow detector, humidity detector, pressure monitor, and thermometer.

16. The data management system of claim 14 wherein the water quality detector is selected from the group consisting of pH detector, conductivity detector, total organic content detector, endotoxin detector, coliform detector, metal detector, and thermometer.

17. The data management system of claim 14 wherein the U.S. Food and Drug Administration requirements are electronic records and electronic signature requirements.

18. The data management system of claim 14 wherein the U.S. Food and Drug Administration requirements are set forth in United States 21 CFR Part 11.

19. The data management system of claim 14 wherein the first and second user reports are configurable reports having configurable records selected from the group consisting of data records to include, displayed fields, sort and grouping of data records, and formatting of data via a table, bar chart, pie chart, or other visual display.

20. The data management system of claim 14 further configured to allow a user to configure access of a specific individual with access to a predetermined specific system function.

21. The data management system of claim 14 wherein the electronic communication between the hub and the equipment is accomplished by a link device that interfaces with the equipment used to measure the first set of data.

22. A computer-readable medium having computer-executable instructions for performing the steps of:
a) collecting environmental data from a piece of equipment used to automatically measure environmental data, the equipment selected from the group consisting of a particle counter, organism identification system, viable air sampler, rapid organism enumeration technology device, bioluminescence device, and water quality detector;
b) storing the collected environmental data; and
c) generating a user report of the environmental data, the user report providing document compliance with U.S. Food and Drug Administration requirements.

23. The computer-readable medium of claim 22 wherein the U.S. Food and Drug Administration requirements are electronic records and electronic signature requirements.

24. The computer-readable medium of claim 22 wherein the U.S. Food and Drug Administration requirements are set forth in United States 21 CFR Part 11.

25. The computer-readable medium of claim 22 having further computer-executable instructions for performing the step of configuring the report for certain items, the certain items selected from the group consisting of data records to include, displayed fields, sort and grouping of data records, and formatting of data via a table, bar chart, pie chart, or other visual display.

26. The computer-readable medium of claim 22 having further computer-executable instructions for performing the step of configuring access of a specific individual with access to a predetermined specific system function.

27. A computer-readable medium having at least one computer-executable module for specialized tracking of data unique for a particular manufacturing facility, the data selected from the group consisting of media growth promotion, sterility testing, media fills, bioburden, equipment maintenance and calibration, annual report, antibiotic assay, biological indicator, corrective and preventative action, cleaning and disinfection validation and tracking, container closure integrity, endotoxin testing, filter integrity, package integrity, preservative effectiveness testing, and smoke studies, the module having computer-executable instructions for performing the steps of
a) collecting the data;
b) storing the collected data; and
c) generating a user report of the environmental data, the user report providing document compliance with U.S. Food and Drug Administration requirements.

28. The computer-readable medium of claim 27 wherein the U.S. Food and Drug Administration requirements are electronic records and electronic signature requirements.

29. The computer-readable medium of claim 27 wherein the U.S. Food and Drug Administration requirements are set forth in United States 21 CFR Part 11.

30. The computer-readable medium of claim 27 having further computer-executable instructions for performing the step of configuring the report for certain items, the certain items selected from the group consisting of data records to include, displayed fields, sort and grouping of data records, and formatting of data via a table, bar chart, pie chart, or other visual display.

31. The computer-readable medium of claim 27 having further computer-executable instructions for performing the step of configuring access of a specific individual with access to a predetermined specific system function.

* * * * *

INTER PARTES REEXAMINATION CERTIFICATE (0317th)

United States Patent
Levinson et al.

(10) Number: US 6,904,370 C1
(45) Certificate Issued: Nov. 15, 2011

(54) SYSTEM, METHOD, AND COMPUTER-READABLE MEDIUM FOR COLLECTION OF ENVIRONMENTAL DATA AND GENERATION OF USER REPORT FOR COMPLIANCE WITH FDA REQUIREMENTS

(75) Inventors: George M. Levinson, Long Grove, IL (US); Timothy P. Joyce, Chicago, IL (US); Victoria Galliani, Lincolnshire, IL (US)

(73) Assignee: Compliance Software Solutions Corp., Vernon Hills, IL (US)

Reexamination Request:
No. 95/000,417, Feb. 13, 2009
No. 90/010,857, Feb. 17, 2010

Reexamination Certificate for:
Patent No.: 6,904,370
Issued: Jun. 7, 2005
Appl. No.: 10/747,974
Filed: Dec. 30, 2003

(51) Int. Cl.
*G06F 17/60* (2006.01)
*G06F 19/00* (2006.01)

(52) U.S. Cl. .............................. 702/19; 702/24; 702/84; 702/182; 702/184

(58) Field of Classification Search ..................... None
See application file for complete search history.

(56) References Cited

To view the complete listing of prior art documents cited during the proceedings for Reexamination Control Numbers 95/000,417 and 90/010,857, please refer to the USPTO's public Patent Application Information Retrieval (PAIR) system under the Display References tab.

*Primary Examiner* — William H. Wood

(57) ABSTRACT

A system, method, and computer-readable medium for the collecting and storing of environmental data, and generating a user report of the environmental data, the user report providing document compliance with U.S. Food and Drug Administration requirements. The collected and stored environmental data includes a wide variety of manufacturing facility parameter data, including but is not limited to, the presence of viable microbiological organisms, the presence of particulates and other environmental conditions within the facility, such as humidity, pressure, temperature, water quality (e.g., pH, conductivity, total organic content (TOC), endotoxin, coliform, and metals), and the respective amounts of different materials involved in the manufacture of the end product(s).

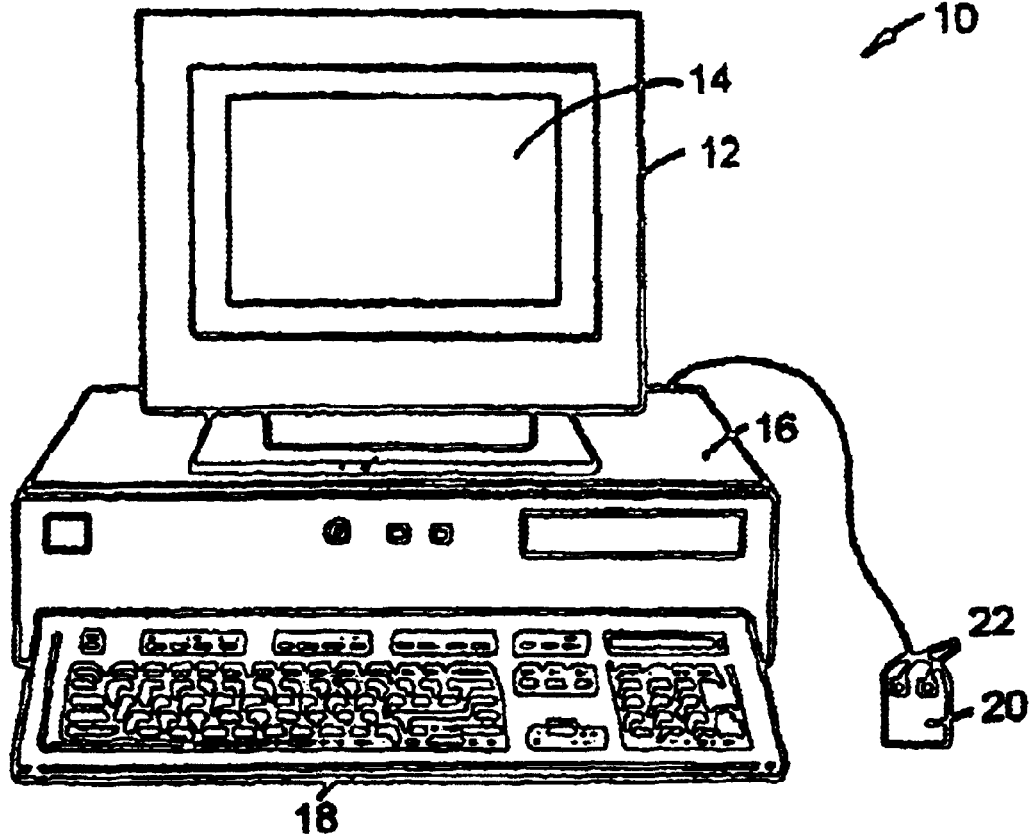

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-31 are cancelled.

\* \* \* \* \*